United States Patent
Hrinčár et al.

(10) Patent No.: US 11,361,517 B1
(45) Date of Patent: Jun. 14, 2022

(54) VIDEO GAME CONTROLLED BY PLAYER MOTION TRACKING

(71) Applicant: Facebook Technologies, LLC, Menlo Park, CA (US)

(72) Inventors: Vladimír Hrinčár, Prague (CZ); Ján Ilavský, Tlustice (CZ)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/168,134

(22) Filed: Feb. 4, 2021

Related U.S. Application Data

(63) Continuation of application No. 16/435,342, filed on Jun. 7, 2019, now Pat. No. 10,950,055, which is a
(Continued)

(51) Int. Cl.
*A63F 13/00* (2014.01)
*G06T 19/00* (2011.01)
(Continued)

(52) U.S. Cl.
CPC .......... *G06T 19/006* (2013.01); *A63F 13/211* (2014.09); *A63F 13/428* (2014.09);
(Continued)

(58) Field of Classification Search
CPC ...... A63F 13/211; A63F 13/428; A63F 13/85; A63F 2300/64; A63F 2300/8029;
(Continued)

(56) References Cited

U.S. PATENT DOCUMENTS

| 6,200,138 B1 | 3/2001 | Ando et al. |
| 10,780,349 B2 | 9/2020 | Hrincár et al. |

(Continued)

OTHER PUBLICATIONS

"Center of the World" from encyclopedia.com <encyclopedia.com/environment/encyclopedias-almanacs-transcripts-and-maps/center,world#:-text=The%20term%20center%20of%20the,the%20real%20is%20fully%20manifest> accessed Jul. 30, 2020. 7 pages.
(Continued)

*Primary Examiner* — Justin L Myhr
(74) *Attorney, Agent, or Firm* — Potomac Law Group, PLLC

(57) ABSTRACT

A rhythm-based video game ("game") is disclosed. In the game, a player slashes blocks representing musical beats using a pair of energy blades resembling a lightsaber. A gaming console renders multiple digital objects, e.g., digital blocks, digital mines and digital obstacles, that are approaching a player in a virtual space. The gaming console also renders a digital representation of an instrument, e.g., a lightsaber ("digital saber"), using which the player slashes, cuts or otherwise interacts with the digital blocks to cause a digital collision between the digital saber and the digital blocks. The player can score by slashing the digital blocks, not hitting the digital mines and avoiding the digital obstacles. The game presents the player with a stream of approaching digital objects in synchronization with music, e.g., a song's beats, being played in the game. The pace at which the digital blocks approach the player increases with the beats.

20 Claims, 23 Drawing Sheets

Related U.S. Application Data continuation-in-part of application No. 16/195,498, filed on Nov. 19, 2018, now abandoned.

(60) Provisional application No. 62/755,468, filed on Nov. 3, 2018.

(51) Int. Cl.

| | | |
|---|---|---|
| *A63F 13/85* | (2014.01) | |
| *A63F 13/428* | (2014.01) | |
| *H04L 67/131* | (2022.01) | |
| *G06F 3/01* | (2006.01) | |
| *G06F 3/0481* | (2022.01) | |
| *G02B 27/01* | (2006.01) | |
| *A63F 13/211* | (2014.01) | |

(52) U.S. Cl.
CPC ............ *A63F 13/85* (2014.09); *G02B 27/017* (2013.01); *G06F 3/011* (2013.01); *G06F 3/0481* (2013.01); *H04L 29/06034* (2013.01); *A63F 2300/64* (2013.01); *A63F 2300/8029* (2013.01)

(58) Field of Classification Search
CPC ........ A63F 13/44; A63F 13/46; A63F 13/814; G02B 27/017; G02B 2027/014; G02B 2027/0187; G06F 3/011; G06F 3/0481; G06F 3/012; G06F 3/014; G06F 3/017; G06F 3/0346; G06F 3/04815; G06T 19/006; G06T 19/20; G06T 2210/21; G06T 2219/2004; H04L 29/06034; H04L 67/38
See application file for complete search history.

(56) References Cited

U.S. PATENT DOCUMENTS

| | | | |
|---|---|---|---|
| 10,950,055 B2 | 3/2021 | Hrincár et al. | |
| 2002/0160823 A1* | 10/2002 | Watabe | A63F 13/814 463/7 |
| 2007/0211025 A1* | 9/2007 | Sato | G06F 3/0346 345/158 |
| 2007/0243915 A1* | 10/2007 | Egozy | G09B 5/06 463/7 |
| 2008/0064500 A1* | 3/2008 | Satsukawa | A63F 13/04 320/137 |
| 2008/0300055 A1* | 12/2008 | Lutnick | G06V 40/107 463/39 |
| 2009/0117958 A1 | 5/2009 | Ueshima et al. | |
| 2010/0151948 A1* | 6/2010 | Vance | A63F 13/10 463/43 |
| 2011/0003639 A1* | 1/2011 | Takehiro | A63F 13/2145 463/43 |
| 2011/0287842 A1* | 11/2011 | Yamada | A63F 13/211 463/43 |
| 2013/0113826 A1* | 5/2013 | Miyazaki | G06F 3/011 345/632 |
| 2013/0194182 A1* | 8/2013 | Tarama | A63F 13/46 345/158 |
| 2013/0203492 A1* | 8/2013 | Yum | A63F 13/44 463/31 |
| 2016/0195940 A1* | 7/2016 | Hall | G06T 17/20 345/158 |
| 2017/0266551 A1 | 9/2017 | Baba | |
| 2017/0329515 A1 | 11/2017 | Clement et al. | |
| 2018/0108179 A1 | 4/2018 | Tomlin et al. | |
| 2019/0243472 A1 | 8/2019 | Stafford et al. | |
| 2020/0139226 A1 | 5/2020 | Hrincár et al. | |
| 2020/0139240 A1 | 5/2020 | Hrincár et al. | |
| 2020/0143595 A1 | 5/2020 | Hrincár et al. | |

OTHER PUBLICATIONS

"Je teste Beat Saber@Gamescom", https:/www.youtube.com/watch?v=LDxCv8X1w4Y&t=4s, Aug. 28, 2017, 2 pages.

"Osu! the game", evidenced by https//en.wikikpedia.or/w/index.php?title=Osu!&oldid=807743069 and https://www.youtube.com/watch?v=kwoR1TKQF4Y, Sep. 16, 2007, pp. 1-15.

"Wii Sports Resort—Swordplay Speed Slice vs. Champion Matt + All Stamps", youtube.com, <https://www.youtube.com/watch?v+tO_SBUDLIG, Nov. 15, 2015, pp. 1-9.

Jagneaux D., "Lightsabers Come to Robo Recall with this Fan-Made Star Wars Mod," Uploadvr.com [online], Apr. 4, 2017, 2 pages, Retrieved from the Internet: URL: https://uploadvr.com/robo-recall-star-wars-mod/.

"Speed Slice—Wii Sports Resort Wiki Guide—IGN," Sep. 12, 2012 [Retrieved on Oct. 30, 2019], 7 pages, Retrieved from the Internet: URL: https://www.ign.com/wikis/wii-sports-resort/Speed_Slice#Speed_Slice.

TOMMYT999., "Virtual Reality Lightsaber + Music = Beat Saber VR Gameplay," Youtube [Online], May 19, 2018, 1 page, Retrieved from the Internet: URL:www.youtube.com/watchv=0V623RJgA6s.

"SW Mod Update for Robo Recall," MGS Studio, Youtube [Online], Mar. 12, 2017, 1 page, Retrieved from the Internet: URL: www.youtube.com/watchv=m32d_Yshp38&feature=you.tube.

\* cited by examiner

VIDEO GAME CONTROLLED BY PLAYER MOTION TRACKING

CROSS-REFERENCE TO RELATED APPLICATIONS

This application is a continuation of U.S. application Ser. No. 16/435,342, entitled "VIDEO GAME CONTROLLED BY PLAYER MOTION TRACKING," filed on Jun. 7, 2019, which is a continuation-in-part of U.S. application Ser. No. 16/195,498, entitled "VIDEO GAME CONTROLLED BY PLAYER MOTION TRACKING," filed Nov. 19, 2018 and also claims priority to U.S. Provisional Application No. 62/755,468, entitled "VIDEO GAME INCLUDING BODY TRACKING AND VIRTUAL OBJECTS, filed Nov. 3, 2018, all of which are incorporated herein by reference for all purposes.

TECHNICAL FIELD

The disclosure is related to video games, and more specifically to video games that track the movements of the player.

BACKGROUND

A player-tracking video game is one where a user's movements (e.g., of their head, body, arms, wrists, hands, or legs) provide meaningful controls to the game. Player-tracking games take a variety of forms and often include music video games.

A music video game is a video game where the gameplay is meaningfully and often almost entirely oriented around the player's interactions with a musical score or individual songs. Music video games may take a variety of forms and are often grouped with puzzle games due to their common use of "rhythmically generated puzzles." Music video games are distinct from purely audio games in that they feature a visual feedback to lead the player through the game's soundtrack, although eidetic music games can fall under both categories.

DETAILED DESCRIPTION

Figure 1:
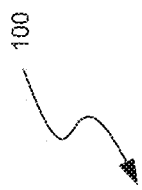
FIG. 1 is a block diagram of an environment in which a rhythm-based video game can be implemented.
Figure 1:
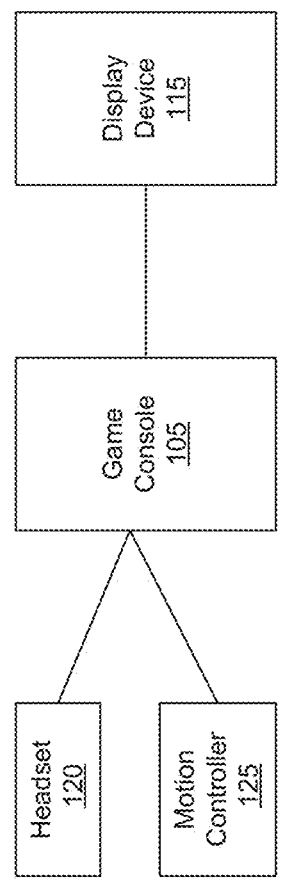
Figure 1:

The disclosure is related to a video game ("game"). In the game a player interacts with digital objects that approach the user in a 3D corridor. Interaction occurs via digital collision between a digital element controlled by the player. Control of the digital element is based on body tracking. In some embodiments, body tracking is performed via a worn or held peripheral that tracks its own movement relative some other reference point. In some embodiments, a depth camera or room-mapping cameras (e.g., Playstation Camera, Microsoft Kinect, LeapMotion, or equivalents) captures video of the player and uses computer vision techniques to identify body positions of the user. The game presents the player with a stream of approaching digital objects and the user causes the digital element to collide with the digital objects based on use of body tracking. Digital collisions with different types of digital objects and from different angles cause a variety of game actions to occur. In some embodiments, the game further tracks the motion of the user's body and shifts a player location in game corresponding to body movements. Movement of the player location enables the player to avoid digital obstacles.

An embodiment of the disclosure is related to a rhythm-based video game. In the rhythm-based video game a player slashes blocks representing musical beats using one or a pair of energy blades resembling a lightsaber (the digital element). A gaming console renders multiple digital objects, e.g., a digital representation of a block ("digital block" or "block"), that are moving in a specified direction, e.g., in a direction towards a user or player. The gaming console also renders a digital representation of an instrument, e.g., a digital representation of a sword resembling a lightsaber ("digital saber"), using which the player slashes, cuts or otherwise interacts with the digital blocks to cause a digital collision between the digital saber and the digital blocks. The game presents the player with a stream of approaching digital blocks in synchronization with beats of music, e.g., a song's beats and notes, being played in the game. As the beat picks up in the music, the pace at which the digital blocks approach the player can increase.

A game action occurs in response to the digital collision. The game action can be any of an increase or decrease in score of the player, an increase or decrease in energy of the player, a gain or loss of life of the player in the game, an increase or decrease in a rate at which the score changes, an increase or decrease in the pace at which the blocks move towards the player, etc. The game can end based on multiple factors, such as after a specified time period, when the player runs out of energy or lives, or when the player issues a command to stop the game. The video game can be implemented as a two-dimensional (2D) video game, a three-dimensional (3D) video game, a virtual reality (VR) game, or an augmented reality (AR) game. In some embodiments, the gaming console is configured to implement the video game as a VR game.

FIG. 1 is a block diagram of an environment 100 in which the rhythm-based video game can be implemented. The environment 100 includes a gaming console 105 which executes a rhythm-based video game, such as the one described above. In some embodiments, the gaming console 105 can be a computing device having a processor and memory, and the processor executes instructions stored in the memory to present the game to a player 110 on a display device 115. The display device 115 supports 2D and/or 3D rendering of the game. In some embodiments, the player 110 may have to wear 3D glasses (not illustrated) to experience the game in 3D. The gaming console 105 supports a VR implementation of the game. In the VR implementation, an apparatus such as a headset 120 may have to be used by the player 110 to experience the game in VR.

The headset 120 is head-mounted device, which is used to track the orientation or position of a body or head of the player 110. The headset 120 has one or more display devices that presents the game in VR. The headset 120 can also have one or more sensors that are used to determine and transmit coordinates of the position of the player 110 to the gaming console 105. Examples of such sensors include gyroscopes, accelerometers, structured light systems, depth sensing cameras, magnetic position sensors, and eye tracking sensors. Sensors can be located in one or more locations, e.g., integrated with the headset 120, be worn by the player 110 anywhere on the body, integrated with a motion controller 125, or part of other equipment worn by the player 110. The gaming console 105 establishes the position of the player 110 in a 3D virtual space by translating the coordinates received from the headset 120 to coordinates in the 3D virtual space. The coordinates received from the headset 120 can also help in determining different positions or actions of the player 110, e.g., whether the player 110 is sitting, standing, ducking, jumping, moving, etc. The headset 120 may include a microphone to receive any audio input from the player 110 or the surroundings of the player 110. The headset 120 may include one or more speakers that outputs audio to the player 110, such as the song being played in the game. The headset 120 can communicate with the gaming console 105 wirelessly or using wired means.

The environment 100 also includes a hand-held or hand-worn apparatus such as a motion controller 125, which is used to track an orientation, position and movement of the hand of the player 110. The motion controller 125 includes one or more sensors, e.g., such as the ones mentioned above, that track the orientation, position and motion of the hand of the player 110 (examples include an Oculus Touch, a Samsung Gear controller, a PlayStation Move, or a Nintendo Switch controller). In some embodiments, the motion controller includes a magnetic position sensor that senses a position of the motion controller 125 in relation to a non-hand-held peripheral, e.g., headset 120. The motion controller 125 transmits the coordinates of the hand and/or the movement of the hand to the gaming console 105, which then translates the movement to the 3D virtual space. The motion controller 125 can also include a haptic feedback mechanism that provides haptic feedback, e.g., when the player 110 slashes the digital block. In some embodiments, the environment 100 may include more than one motion controller 125, e.g., a pair of motion controllers. The player 110 can hold one motion controller in one hand and the other in the other hand. In some embodiments, a single motion controller 125 is held in both hands. In a two-player game one player can hold one motion controller and the other player can hold the other motion controller. The motion controller 125 can be of any shape, size or dimension that is suitable to be held in the hand of a player. The motion controller 125 can communicate with the gaming console 105 wirelessly or using wired means. The motion controller 125 can also communicate with other devices, such as headset 120, wirelessly or using wired means.

Figure 2:
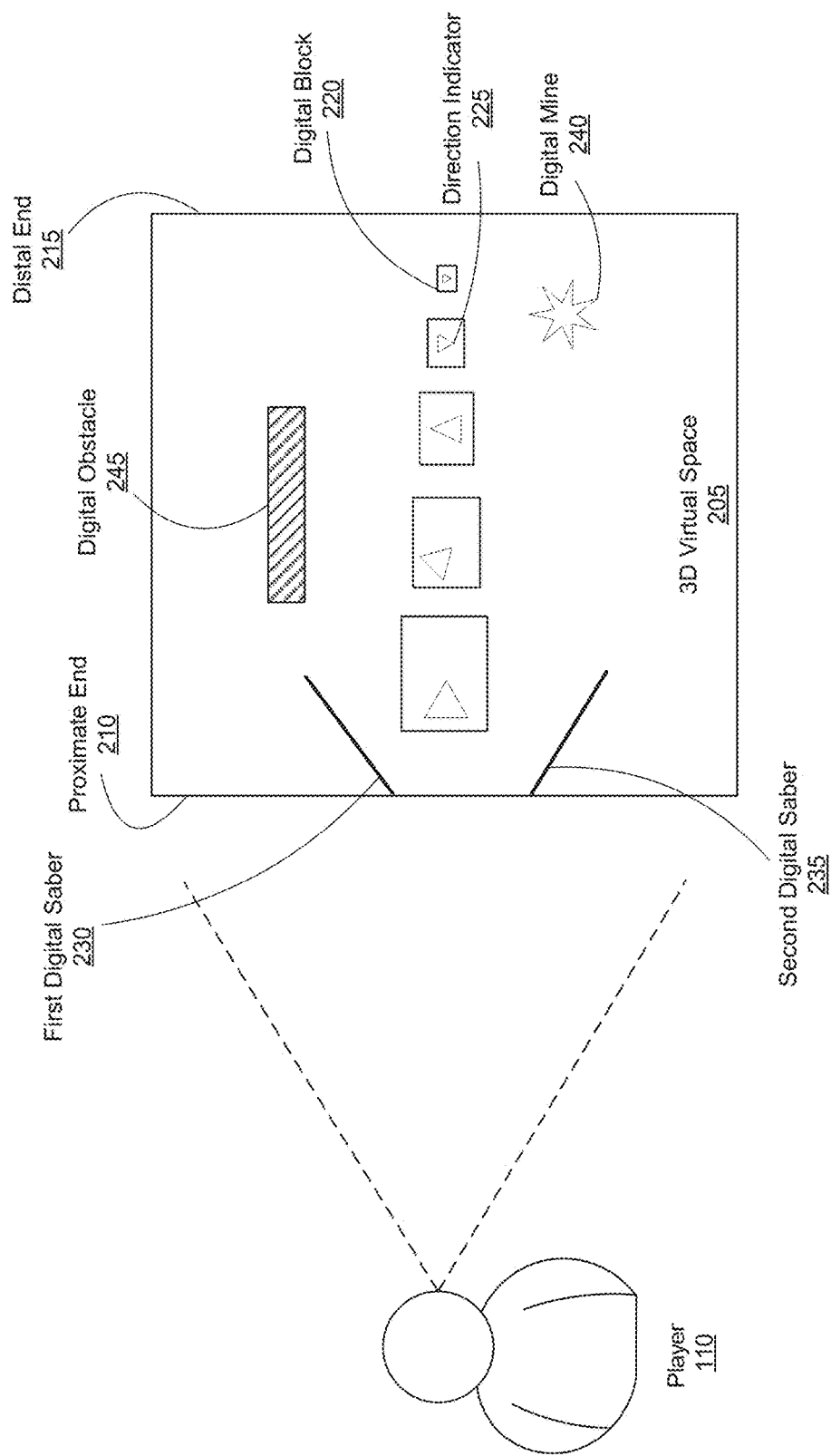
FIG. 2 is a block diagram of a three-dimensional (3D) virtual space in which the game is played, consistent with various embodiments.

In the rhythm-based video game, the gaming console 105 establishes a 3D virtual space, such as the 3D virtual space 205 of FIG. 2. The 3D virtual space 205 includes a position of the player 110, e.g., which is determined based on the coordinates of the position of the player 110 obtained from the headset 120. The 3D virtual space 205 includes a proximate end 210 that is proximate to the player 110 and a distal end 215 opposite to the proximate end 210. A portion of the proximate end 210 corresponds to the position of the player 110. In some embodiments, the player may calibrate the controller or the virtual space 205 to themselves. Calibration may be performed by the hardware, or manually by the player.

The gaming console 105 renders multiple digital objects, e.g., a digital block 220, that are approaching the player 110 from the distal end 220. In some embodiments, the digital block 220 may appear bigger in size as it approaches the proximate end 210. The gaming console 105 also renders a digital representation of an instrument, e.g., a digital saber, using which the player 110 can slash, cut or otherwise interact with the digital block 220 to cause a game action to occur in the game. The game presents the player 110 with a stream of the digital blocks in synchronization with beats of music, e.g., a song's beats and notes, being played in the game. As the beat picks up in the music, the pace at which the digital blocks approach the player 110 can increase.

In the VR implementation, the motion controller 125 can be a VR based motion controller, which is represented as a digital saber in the 3D virtual space 205. The player 110 uses a pair of VR motion controllers to wield a pair of digital lightsabers, e.g., a first digital saber 230 and a second digital saber 235, in the 3D virtual space 205 to slash the digital blocks. The digital blocks can be of various types, e.g., a first type and a second type, which the player 110 may interact with using the two different digital sabers. A specific type of digital blocks should be interacted with using a specified digital saber. In some embodiments, the first type of digital blocks can be of a first color and may have to be interacted with using a digital saber of the corresponding color, and the second type of digital blocks can be of a second color and may have to be interacted with using a digital saber of the corresponding color. For example, each digital block is colored red or blue to indicate whether the red or blue digital saber should be used to slash it.

In some embodiments, each of the digital blocks is marked with a direction indicator 225, which indicates the direction to slash through the digital block. For example, a directional indicator 225 such as an arrow can indicate one of eight possible directions to slash through the digital block 220. In another example, a directional indicator 225 such as a dot can indicate that the player 110 may slash through the digital block 220 in any direction. When a digital block is slashed by a digital saber, the digital block is destroyed, and a score is awarded based on one or more factors, e.g., timing accuracy and physical positioning of the cut.

The game can also present digital objects other than digital blocks, which the player 110 should not hit. For example, the game can present a digital object such as a "digital mine" 240 that the player 110 should not hit. In another example, the game can present obstacles such as a digital representation of an oncoming wall ("digital obstacle") 245 that the player 110 or the head of the player 110 should avoid. The player 110 can avoid the digital obstacle 245 approaching the proximate end 210 by moving out of the path of digital obstacle 245, which can be done by stepping to the right or left of the digital obstacle 245 or by ducking below the digital obstacle 245. For example, if the player 110 steps to the right (in the real world) of the oncoming digital obstacle 245, the gaming console 105 shifts at least a portion of the 3D virtual space 205 to the right of the player 110 so that the digital obstacle ends up passing through the left of the player 110 at the proximate end 210.

The sensors worn by the player 110, e.g., in the headset 120, motion controller 125 or elsewhere, can transmit the coordinates of the player 110, portion of the body of the player 110, such as a head of the player 110, movements of the player 110, or movements of a portion of the body of the player 110 to the gaming console 105. The gaming console 105 translates the received coordinates to the coordinates in the 3D virtual space 205 and determines the action of the player 110, e.g., whether there was a digital collision between a digital block and a digital saber, whether there was a digital collision between a digital obstacle and a digital saber, whether there was a digital collision between a digital wall and any portion of the body of the player 110 (which corresponds to a portion of the 3D virtual space in the proximate end 210), whether the player 110 moved out of the path of the approaching digital obstacles, etc., which result in a specified game action.

A game action can occur in response to a digital collision between a digital saber and a digital object. The game action can be any of an increase or decrease in score of the player, an increase or decrease in energy of the player 110, a gain or loss of life of the player 110 in the game, an increase or decrease in a rate at which the score changes, an increase or decrease in the pace at which the digital objects are created or move towards the player 110, etc. Different types of game actions can occur in response to different events. For example, a score of the player 110 can increase in response to a digital collision between a digital block of a specified color and the digital saber of the specified color. In another example, a score of the player 110 can decrease in response to a digital collision between a digital block of a specified color and a digital saber of a color other than the specified color. In another example, a score of the player 110 may increase, or increase by an amount above a threshold, in response to a digital collision between a digital block and a digital saber in which a contact angle of the digital saber with the digital block is consistent with the direction indicated on the digital block.

In another example, a score of the player 110 may not increase, or increase by an amount below a threshold, in response to a digital collision between a digital block and a digital saber in which a contact angle of the digital saber with the digital block is not consistent with the direction indicated on the digital block. In another example, a score of the player 110 may not increase, or increase by an amount below a threshold, in response to a digital collision between a digital block and a digital saber whose collision impact is below a specified threshold.

In some embodiments, the collision impact can be measured as a function of how hard, fast or strong the player 110 swings the motion controller 125 to slash the digital block 220. In another example, a score, energy or life of the player 110 can decrease in response to a digital collision between a digital mine and a digital saber. In another example, a score, energy or life of the player 110 can decrease in response to a digital collision between a digital obstacle and a digital saber or the player 110. In some embodiments, a game action can also occur if there is no digital collision for a specified duration. For example, if the player 110 does not slash through any of the digital blocks for a duration exceeding a specified threshold, a score, energy or life of the player 110 can decrease, or the rate at which the score, energy or life increases can be decreased. The game can be configured to calculate the score, energy, or a life of the player 110 using various factors, including the above specified factors.

The game can end based on one or more factors, such as after a specified time period, when the player runs out of energy or lives, when the player 110 has completed one or more levels of the game, when the music stops playing, or when the player issues a command to stop the game.

As mentioned above, the game can be implemented as a 2D game, 3D game, a VR game, or an AR game. The entities of the environment 100 can be adjusted, adapted or configured for a specific implementation. For example, while the environment 100 described providing the VR gaming experience through the headset 120, in some embodiments, the VR gaming experience can also be created through specially designed rooms with multiple large screens.

In some embodiments, some of the entities of the environment 100 may have to be calibrated before being able to play the game to obtain the coordinates of the position of the player 110. For example, a setup process in the game may ask the player 110 to turn the headset 120 and perform some gestures, such as moving from left to right, right to left, ducking, jumping, or talking. In another example, the setup process in the game may ask the player 110 to move the motion controller in each hand to perform a gesture, such as raising the motion controller, swinging the hand with the motion controller to hit a digital object displayed on the display device 115 or the headset 120. Once the calibration is complete, the gaming console 105 establishes the 3D virtual space 205 after which the player 110 can proceed to play the game.

In some embodiments, the user is able to customize their game experience. Examples include changing the graphical representation on the digital element (the digital sabers) 230/235. The digital sabers 230/235 may change color, change in graphical design and through use of various "skins." The sabers 230/235 may also change in shape or character causing the manner in which the user causes digital collisions to shift. In some embodiments, a player avatar is displayed to the user. The player avatar is customizable using skins and different digital models. In some embodiments, the user is able to generate gameplay via attaching a "beat map" to an audio file. A beat map includes data describing each digital object 220,240,245 that is generated in the 3D virtual space 205, at what point in the audio file the objects 220,240,245 are generated, the speed of the objects 220,240,245, the type/color of each object 220,240,245, the directionality 225 of each object 220,240, 245, and a position and vector in the 3D virtual space 205 of each object 220,240,245. Given a beat map and a corresponding audio file, any song can be played in the game. A digital distribution system may also provide packs or groups of beat maps and audio files to play with the game.

Figure 3:
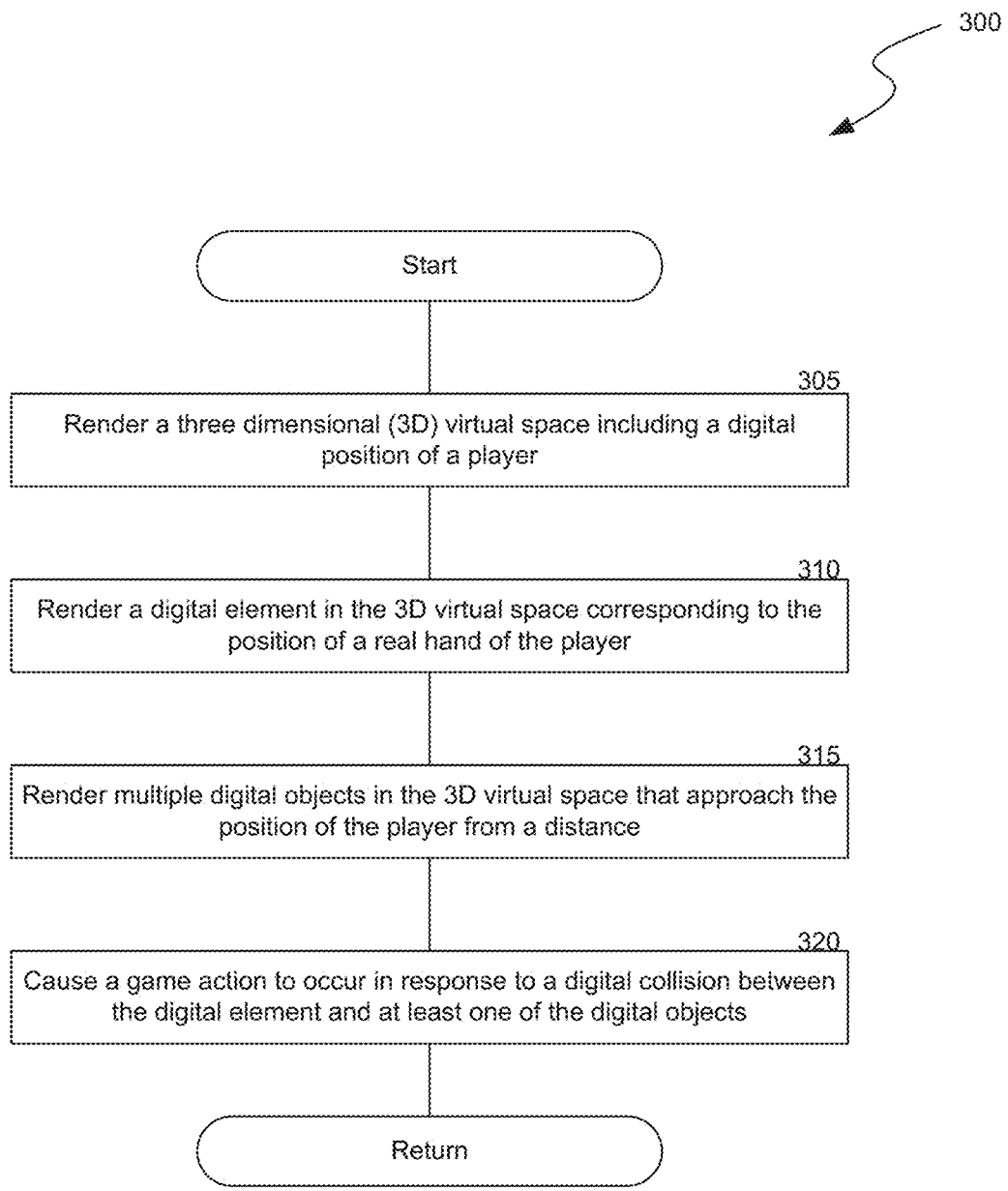
FIG. 3 is a flow diagram of a process for presenting the game to a player, consistent with various embodiments.

FIG. 3 is a flow diagram of a process 300 for presenting the game to a player, consistent with various embodiments. In some embodiments, the process 300 can be implemented in the environment 100 of FIG. 1. The player 110 can complete the setup process to calibrate the motion controller and the headset 120. In some embodiments, the player 110 may need to complete the calibration only once per session, e.g., when the gaming console 105 is powered on and prior to playing a first game and need not calibrate the devices again unless the gaming console 105 is powered off and powered on again. In some embodiments, the devices may have to be calibrated when the player changes. In some embodiments, the devices may have to be calibrated when there are environmental changes around the player 110, e.g., a change in intensity of light in the room where the player 110 plays the game, a change in distance between the player 110 and the gaming console 105, a change in the position of the furniture in the room where the game is played. After the devices are calibrated, the gaming console 105 will have the necessary coordinates to establish the 3D virtual space in which the game is played.

At block 305, the gaming console 105 renders the 3D virtual space 305 in which the game is to be played. The 3D virtual space 305 includes a digital position of the player 110.

At block 310, the gaming console 105 renders a digital element, e.g., a digital saber, in the 3D virtual space 305 relative to the digital position of the player 110. The coordinates and the orientation of the digital saber relative to the digital position correspond to an orientation and the coordinates of the physical hand of the player 110 relative to the physical body of the player 110. The gaming console 105 obtains the orientation and the coordinates of the physical hand of the player 110 relative to the physical body of the player 110 using the motion controller 125 held in the hand of the player 110 and the headset 120 worn by the player 110.

At block 315, the gaming console 105 renders multiple digital objects that approach the digital position of the player 110 from a distance in the 3D virtual space. The digital objects can include digital blocks that the player 110 should slash using the digital element. In some embodiments, the digital objects can include digital mines that the player 110 should not hit, and digital obstacles that the player 110 should avoid.

At block 320, the gaming console 105 causes a game action to occur in response to a digital collision between the digital element and one or more of the digital objects. The different type of game actions that can occur are described at least with reference to FIG. 1.

Figure 4:
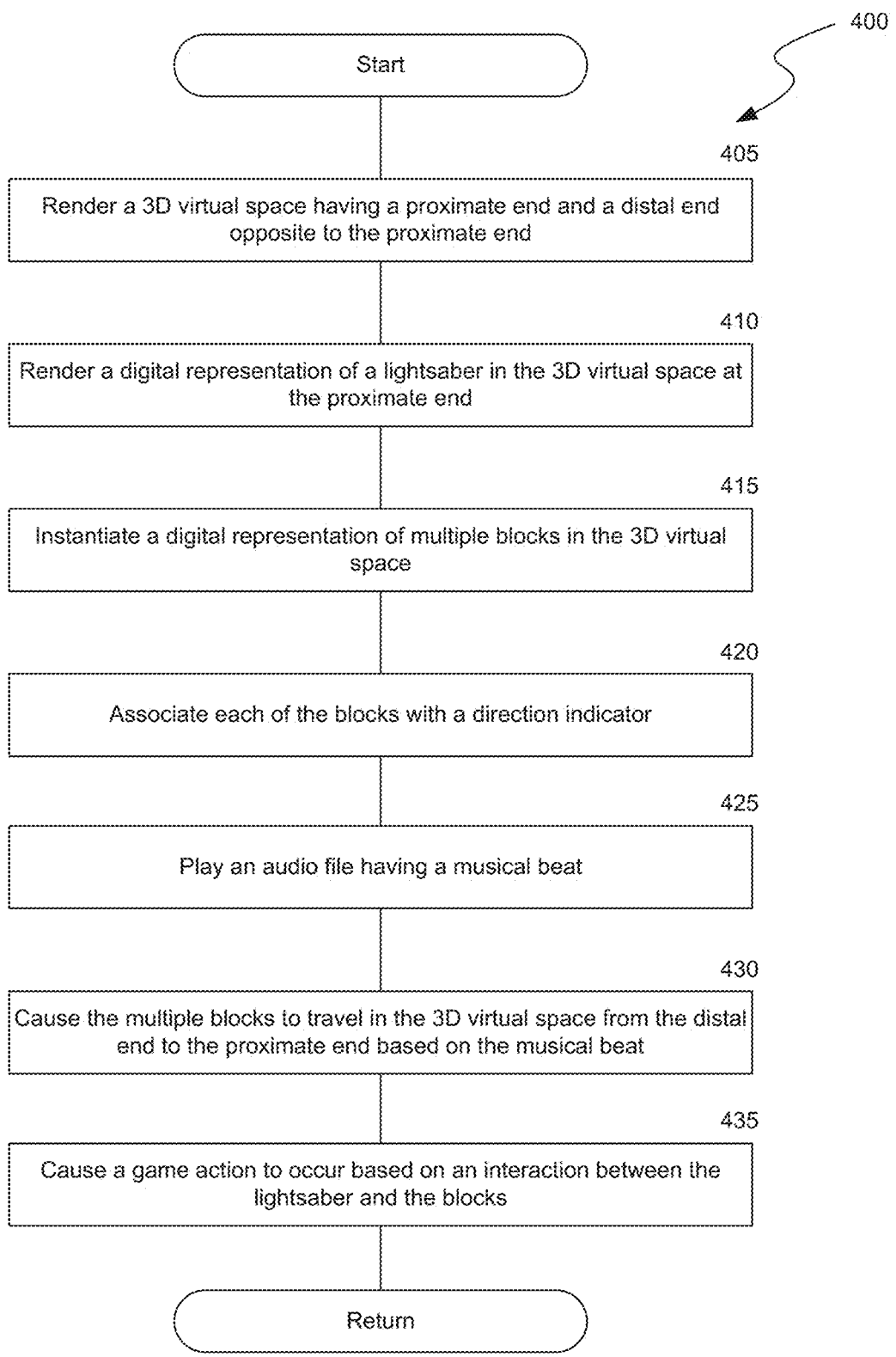
FIG. 4 is a flow diagram of a process for presenting the game to a player, consistent with various embodiments.

FIG. 4 is a flow diagram of a process 400 for presenting the game to a player, consistent with various embodiments. In some embodiments, the process 400 can be implemented in the environment 100 of FIG. 1. The process 400 assumes that the headset 120 and the motion controllers are calibrated. At block 405, the gaming console 105 renders a 4D virtual space in which the game is to be played. The 4D virtual space 205 includes a proximate end 210 that is proximate to the player 110 and a distal end 215 opposite to the proximate end 210. In some embodiments, a portion of the proximate end 210 corresponds to the digital position of the player 110.

At block 410, the gaming console 105 renders a digital representation of an instrument to be used by the player 110, e.g., the first digital saber 230, to play the game. The coordinates and the orientation of the first digital saber 230 relative to the digital position of the player 110 correspond to an orientation and the coordinates of the physical hand of the player 110 relative to the physical body of the player 110.

At block 415, the gaming console 105 instantiates multiple digital blocks in the 4D virtual space 205.

At block 420, the gaming console 105 associates each of the digital blocks with a direction indicator. In some embodiments, the direction indicator indicates the direction in which the digital block is to be slashed by the player 110.

At block 425, the gaming console 105 plays an audio file having a musical beat, e.g., a song.

At block 430, the gaming console 105 causes the multiple digital objects to travel from the distal end 215 to the proximate end 210 in the 4D virtual space 205 in synchronization with the musical beats. For example, the rate at which the digital blocks are created or the pace at which the digital blocks approach the proximate end 210 depend on the musical beats. As the beat picks up in the song, the pace at which the digital blocks approach the player can increase.

At block 435, the gaming console 105 causes a game action to occur based on an interaction between the first digital saber 230 and one or more of the digital blocks. The different type of game actions that can occur are described at least with reference to FIG. 1.

Figure 5:
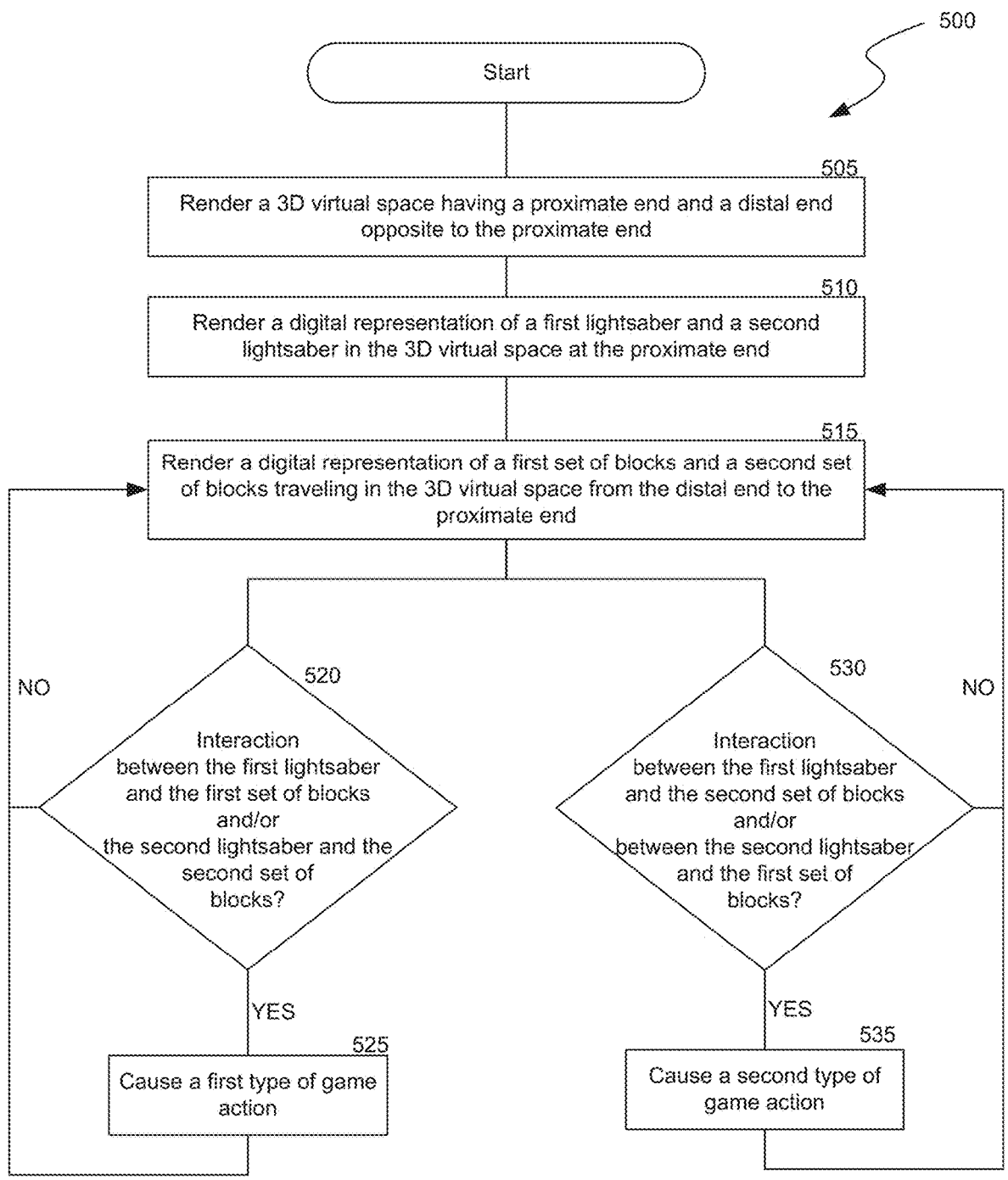
FIG. 5 is a flow diagram of a process for presenting the game to a player, consistent with various embodiments.

FIG. 5 is a flow diagram of a process 500 for presenting the game to a player, consistent with various embodiments. In some embodiments, the process 500 can be implemented in the environment 100 of FIG. 1. The process 500 assumes that the headset 120 and the motion controllers are calibrated. At block 505, the gaming console 105 renders a 3D virtual space in which the game is to be played. The 3D virtual space 205 includes a proximate end 210 that is proximate to the player 110 and a distal end 215 opposite to the proximate end 210. In some embodiments, a portion of the proximate end 210 corresponds to the digital position of the player 110.

At block 510, the gaming console 105 renders a digital representation of instruments to be used by the player 110, e.g., the first digital saber 230 and the second digital saber 235, to play the game. For example, the first digital saber 230 can correspond to the motion controller held by the player 110 in the left hand and the second digital saber 235 can correspond to the motion controller held by the player 110 in the right hand. The coordinates and the orientation of the digital sabers relative to the digital position of the player 110 correspond to an orientation and the coordinates of the physical hands of the player 110 relative to the physical body of the player 110. The digital sabers can have different characteristics. For example, the first digital saber 230 can be a red colored saber and the second digital saber 235 can be a blue colored saber.

At block 515, the gaming console 105 renders multiple digital objects traveling in the 3D virtual space 205 from the distal end 215 to the proximate end 210. The digital blocks can include two different sets of blocks. In some embodiments, the first set of digital blocks can be of a first color and the second set of digital blocks can be of a second color. For example, each digital block is colored red or blue to indicate whether the red or blue digital saber should be used to slash it.

At determination block 520, the gaming console determines whether there was an interaction, e.g., digital collision, between the red digital blocks and the red saber 230 or between the blue digital blocks and the blue saber 235.

If the gaming console 105 determines that at least one of the conditions in block 520 is true, at block 525, the gaming console 105 causes a first type of game action, and the control is transferred to block 515. For example, the first type of game action can be to increase a score of the player 110 in response to a digital collision between a digital block and the digital saber of the same color.

At determination block 530, the gaming console determines whether there was an interaction, e.g., digital collision, between the red digital blocks and the blue saber 235 or between the blue digital blocks and the red saber 230.

If the gaming console 105 determines that at least one of the conditions in block 530 is true, at block 535, the gaming console 105 causes a second type of game action, and the control is transferred to block 515. For example, the second type of game action can be not to increase the score, or decrease the score of the player 110 in response to a digital collision between a digital block and the digital saber of different colors.

Figure 6:
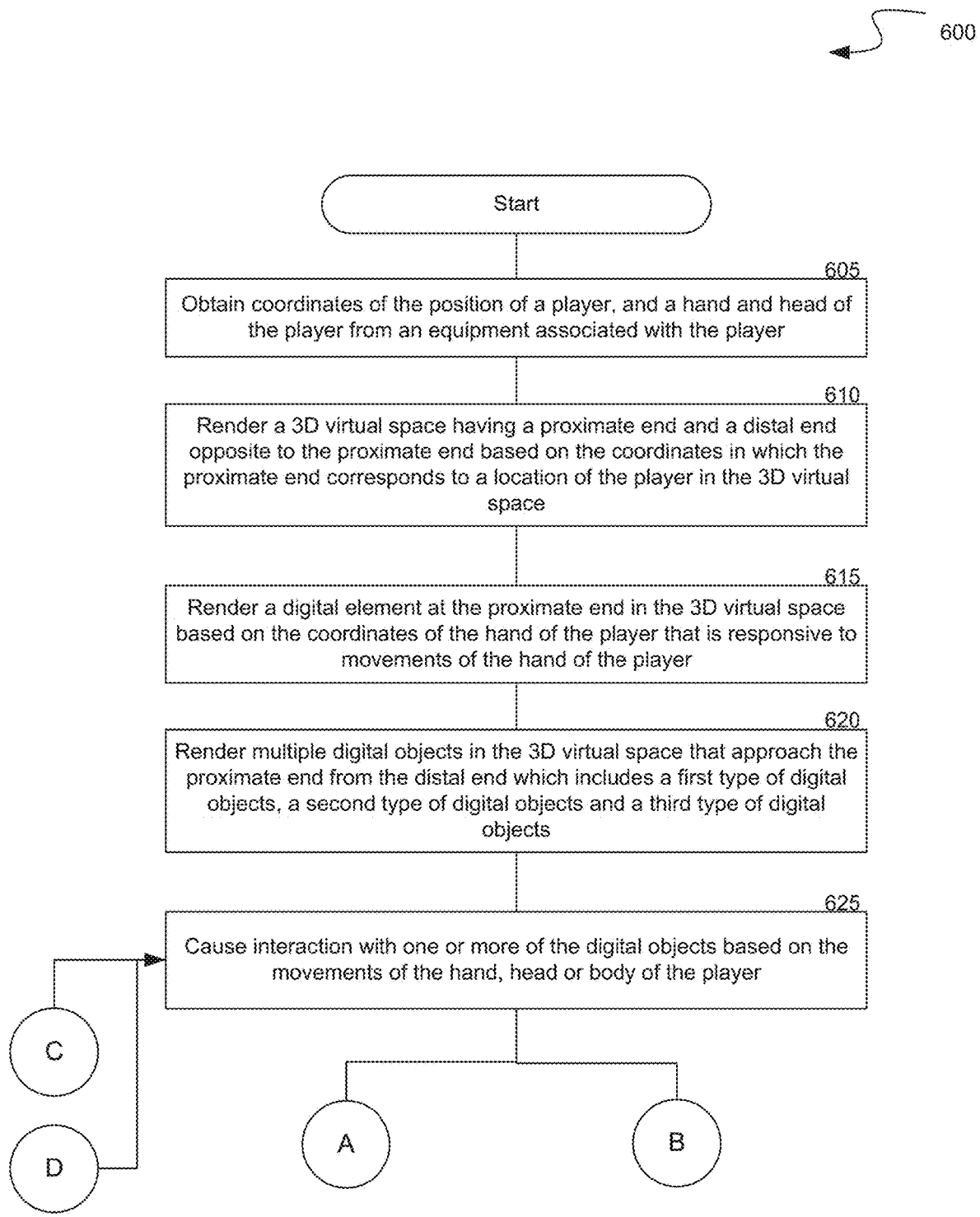
FIG. 6 is a flow diagram of a process for presenting the game to a player, consistent with various embodiments.
Figure 6:
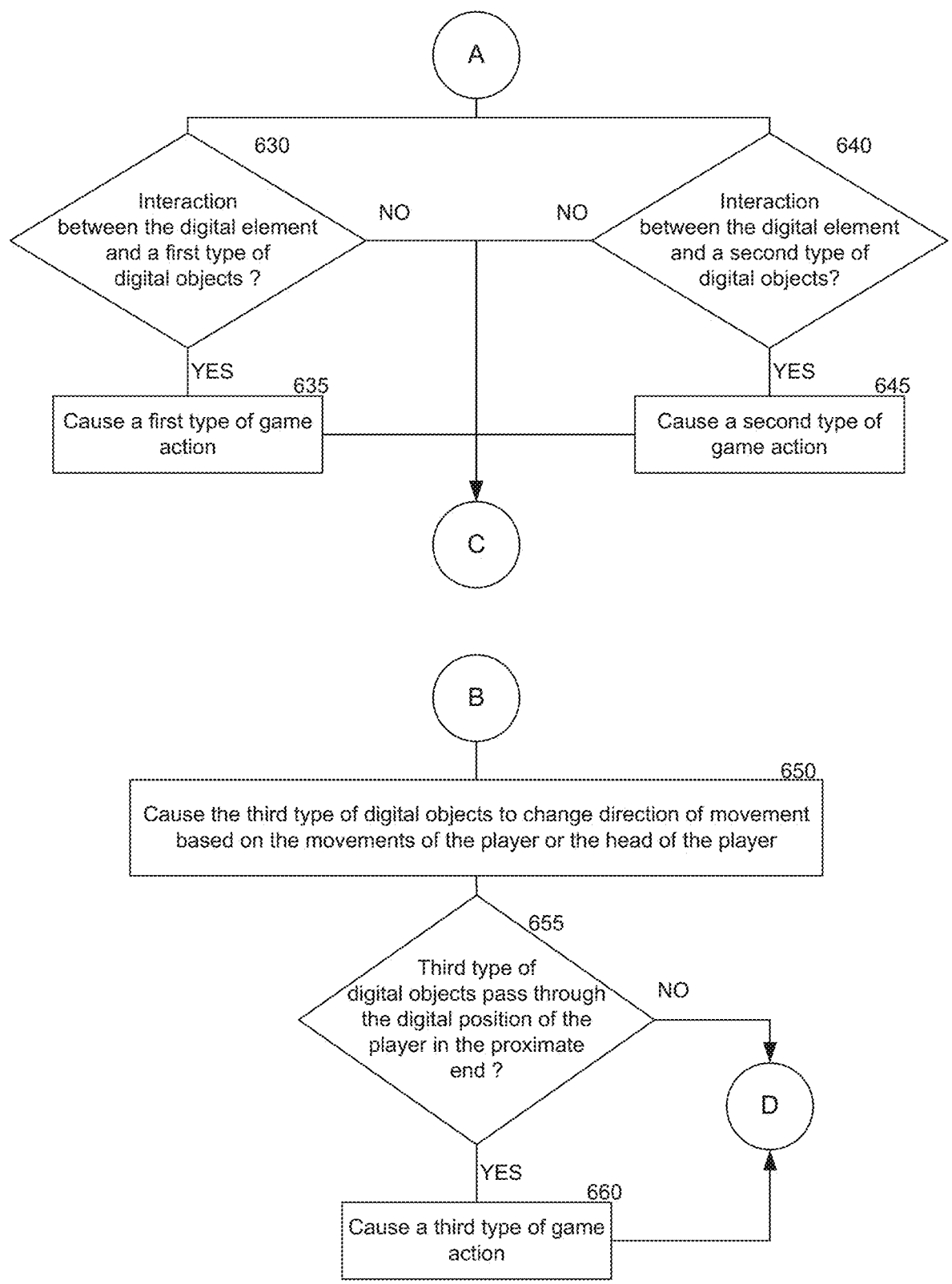

FIG. 6 is a flow diagram of a process 600 for presenting the game to a player, consistent with various embodiments. In some embodiments, the process 600 can be implemented in the environment 100 of FIG. 1. At block 605, the gaming console 105 obtains an orientation and coordinates of the player 110, a hand and head of the player 110 at least from the headset 120 and the motion controller 125.

At block 610, the gaming console 105 renders a 3D virtual space in which the game is to be played. The 3D virtual space 205 is generated based on the coordinates received from the headset 120 and the motion controller 125 associated with the player 110. The 3D virtual space 205 includes a proximate end 210 that is proximate to the player 110 and a distal end 215 opposite to the proximate end 210. In some embodiments, a portion of the proximate end 210 corresponds to the digital position of the player 110.

At block 615, the gaming console 105 renders a digital representation of instruments to be used by the player 110, e.g., the first digital saber 230 and the second digital saber 235, at the proximate end 210. The digital saber is responsive to the movements of the hand of the player 110 holding the motion controller 125. The coordinates and the orientation of the digital sabers relative to the digital position of the player 110 correspond to an orientation and the coordinates of the physical hands of the player 110 relative to the physical body of the player 110.

At block 620, the gaming console 105 renders multiple digital objects traveling in the 3D virtual space 205 from the distal end 215 to the proximate end 210. The digital objects can be of different types. For example, a first type can include digital blocks that the player 110 should slash using the digital saber, a second type can include digital mines that the player 110 should not hit, and a third type can include digital obstacles that the player 110 should avoid.

At block 625, the gaming console 105 causes interaction with the digital objects based on the movement of the hand, head and/or body of the player 110.

At determination block 630, the gaming console 105 determines whether there was an interaction, e.g., digital collision, between a digital block and the digital saber. If yes, at block 635, the gaming console 105 causes a first type of game action. For example, the first type of game action can be to increase a score of the player 110 in response to a digital collision between a digital block and the digital saber. The control is transferred to block 625.

At determination block 640, the gaming console 105 determines whether there was an interaction, e.g., digital collision, between the digital saber and a digital mine. If yes, at block 645, the gaming console 105 causes a second type of game action. For example, the second type of game action can be not to increase the score or decrease the score/energy/life of the player 110 in response to the digital collision between a digital mine and the digital saber. The control is transferred to block 625.

At block 650, the gaming console 105 causes the digital obstacle to change the direction of travel based on actual movements of the player 110 or movements of the head of the player 110.

At determination block 655, the gaming console 105 determines whether the digital obstacle passes through the digital position of the player 110 at the proximate end 210. If yes, at block 660, the gaming console 105 causes a third type of game action. For example, the third type of game action can be to decrease the score/energy/life of the player 110. The control is transferred to block 625.

Figure 7:
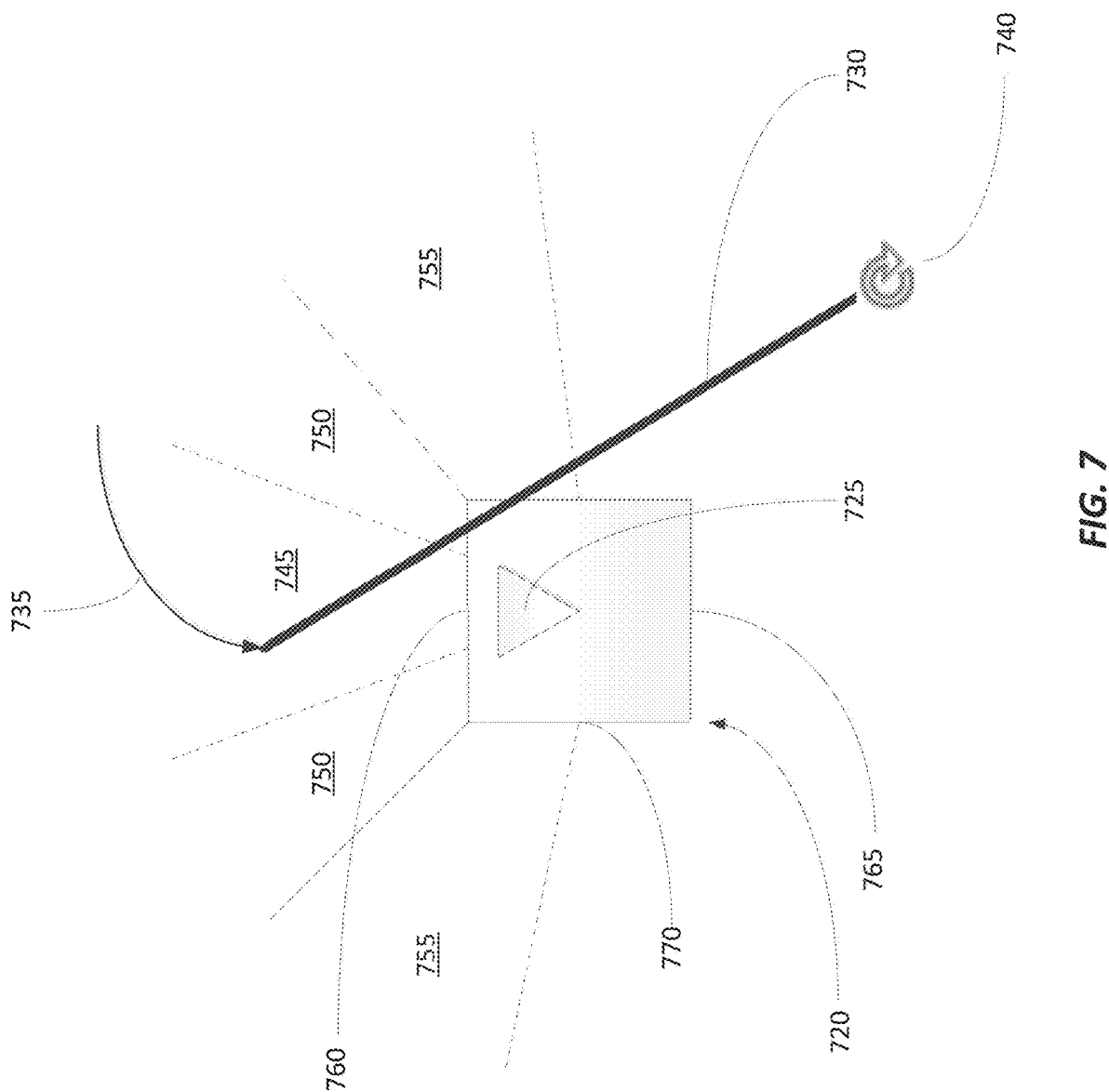
FIG. 7 illustrates variable game actions based on angle and position of incidence between a digital element and a digital object.

FIG. 7 illustrates variable game actions based on angle and position of incidence between a digital element 730 and a digital object 720. The pictured digital object 720 includes a direction indicator 725. In the illustrated example, the digital element 730 is elongated and extends from a control point at the user's hand (as a sword would).

The direction indicator 275 indicates the game's ideal collision direction between the digital element 730 and the digital object 720. Causing a collision using a swing direction 735 that corresponds to the direction indicator 725 results in a positive game action (e.g., rewarding of points), whereas causing a collision at a different direction causes a different game action (e.g., issuing a fault, ending a combo streak, rewarding fewer points than the positive game action, subtracting points).

In some embodiments, angle incidence and/or digital element rotation 740 may affect the type of game action occurring from a collision. Incidence angles 745, 750 and 755 illustrate regions an incoming digital element 730 might collide with the digital object 720. In some embodiments, the game action occurring from a collision is more positive for the user when the collision has an incidence angle 745, 750, 755 closest to on-center (e.g., straight through center "mass" of the digital object 720). For example, the collision may be worth more points depending on where a user strikes the digital object 720 with the digital element 730.

The incidence angles 745, 750,755 may be used as a region (e.g., plus or minus 0-30 degrees from center) or as an absolute measurement (e.g., exactly 37 degrees right or left of center) where a collision at 0 degrees from center is worth the most points. In some embodiments, instead of, or in addition to incidence angles, entry and exit surfaces are used. Where a collision begins and ends on opposite sides of a digital object 720, the digital element 730 took a relatively straight path through the digital object 720. Taking a straight path through the digital object 720 may provide users with a more positive game action (e.g., more points) than a collision that enters and exits through adjacent sides of the digital object 720. Illustrative of the relatively straight path described above is a collision "cut" that begins on surface 760 and exits through surface 765. A collision that does not use a straight path begins at surface 760 and exits through surface 770; or alternatively, a collision that begins at surface 770 and exits through surface 765. The non-straight path collisions may render less positive game actions than straight path collisions.

In some embodiments, the digital element rotation 740 further influences game actions. The digital element rotation 740 is controlled by the user's motion controller or hand gestures. Where the user rotates within the applicable control scheme, the digital element 730 will rotate in game, in a corresponding fashion. Some embodiments of digital elements 730 have varied surfaces. Examples of varied surfaces include a bladed edge of a sword and the flat of a sword. In this example, where a user strikes the digital object 720 with a bladed edge (e.g., a cut), a different game action results than if the user strikes the digital object 720 with the flat side (e.g., a slap). In some embodiments, a cut renders a more positive game action than a slap.

FIGS. 8-16 illustrate screenshots of various graphical user interfaces (GUIs) of the game, which are generated by the gaming console 105 of FIG. 1.

Figure 8:
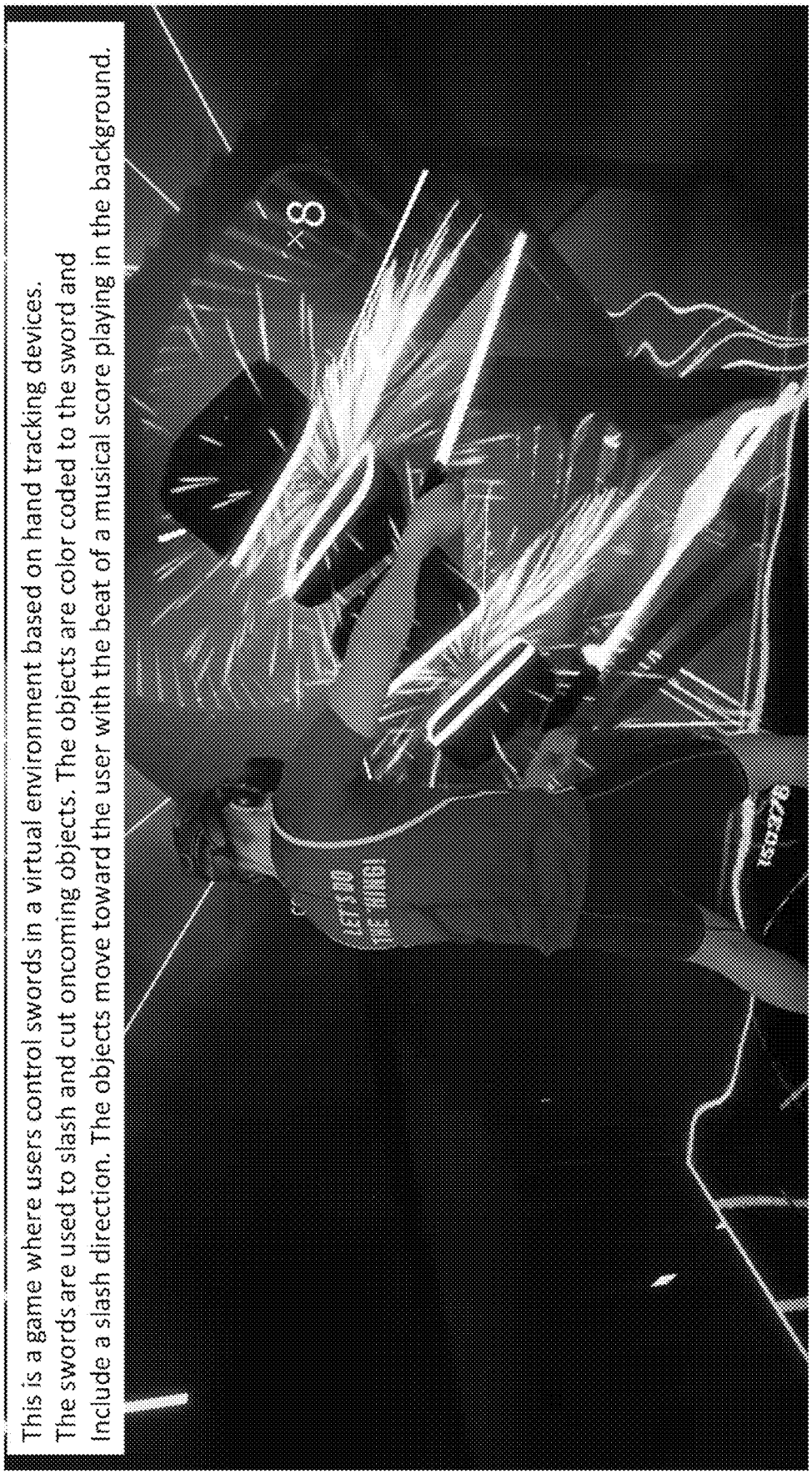
FIG. 8 is a screenshot of a player playing the game, consistent with various embodiments.

FIG. 8 is a screenshot of a player playing the game, consistent with various embodiments. In FIG. 8, the player is holding a pair of motion controllers in the hands which are depicted as digital sabers in the 3D virtual space of the game. FIG. 8 also illustrates the player slashing a pair of digital blocks.

Figure 9:
FIG. 9 is a screenshot of a player view of the 3D virtual space generated by the gaming console, consistent with various embodiments.

FIG. 9 is a screenshot of a player view of the 3D virtual space generated by the gaming console, consistent with various embodiments.

Figure 10:
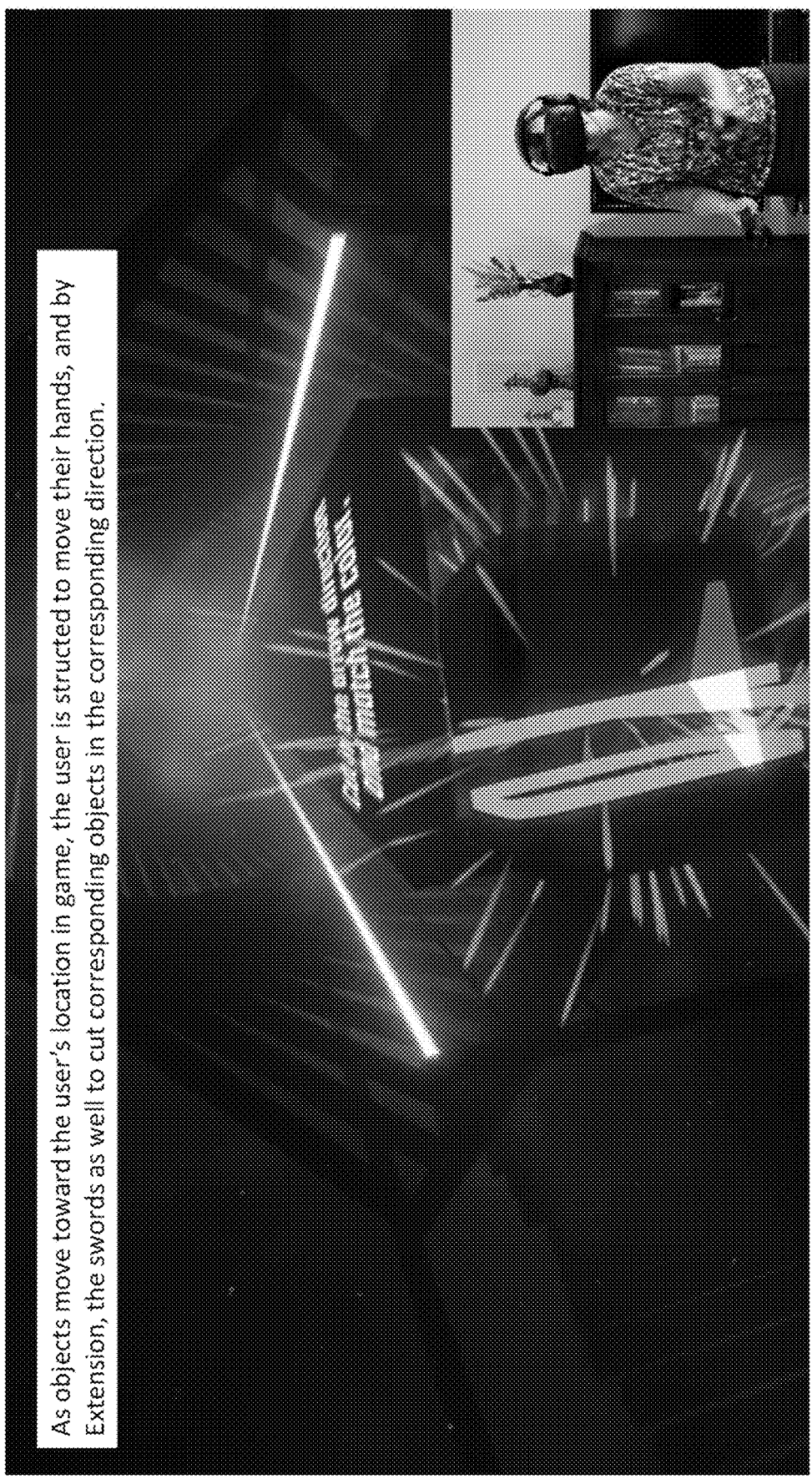
FIG. 10 is a screenshot of a graphical user interface (GUI) with instructions to the player, consistent with various embodiments.

FIG. 10 is a screenshot of a graphical user interface (GUI) with instructions to the player, consistent with various embodiments. In FIG. 10, the GUI instructs the player to move their hands so that the digital sabers cut the digital blocks in the indicated direction.

Figure 11:
FIG. 11 is a screenshot of a GUI with instructions to the player, consistent with various embodiments.

FIG. 11 is a screenshot of a GUI with instructions to the player, consistent with various embodiments. In FIG. 11, the GUI indicates to the player that some of the digital objects presented in the 3D virtual space are meant to be avoided, e.g., by not cutting or slashing the objects.

Figure 12A:
FIG. 12A is a screenshot of a GUI with instructions to the player, consistent with various embodiments.

FIG. 12A is a screenshot of a GUI with instructions to the player, consistent with various embodiments. In FIG. 12A, the GUI indicates to the player that some of the digital objects presented in the 3D virtual space are to be avoided by player's location as opposed to avoiding using the digital sabers. For example, the player can duck, crouch or move to avoid to some of the digital objects.

Figure 12B:
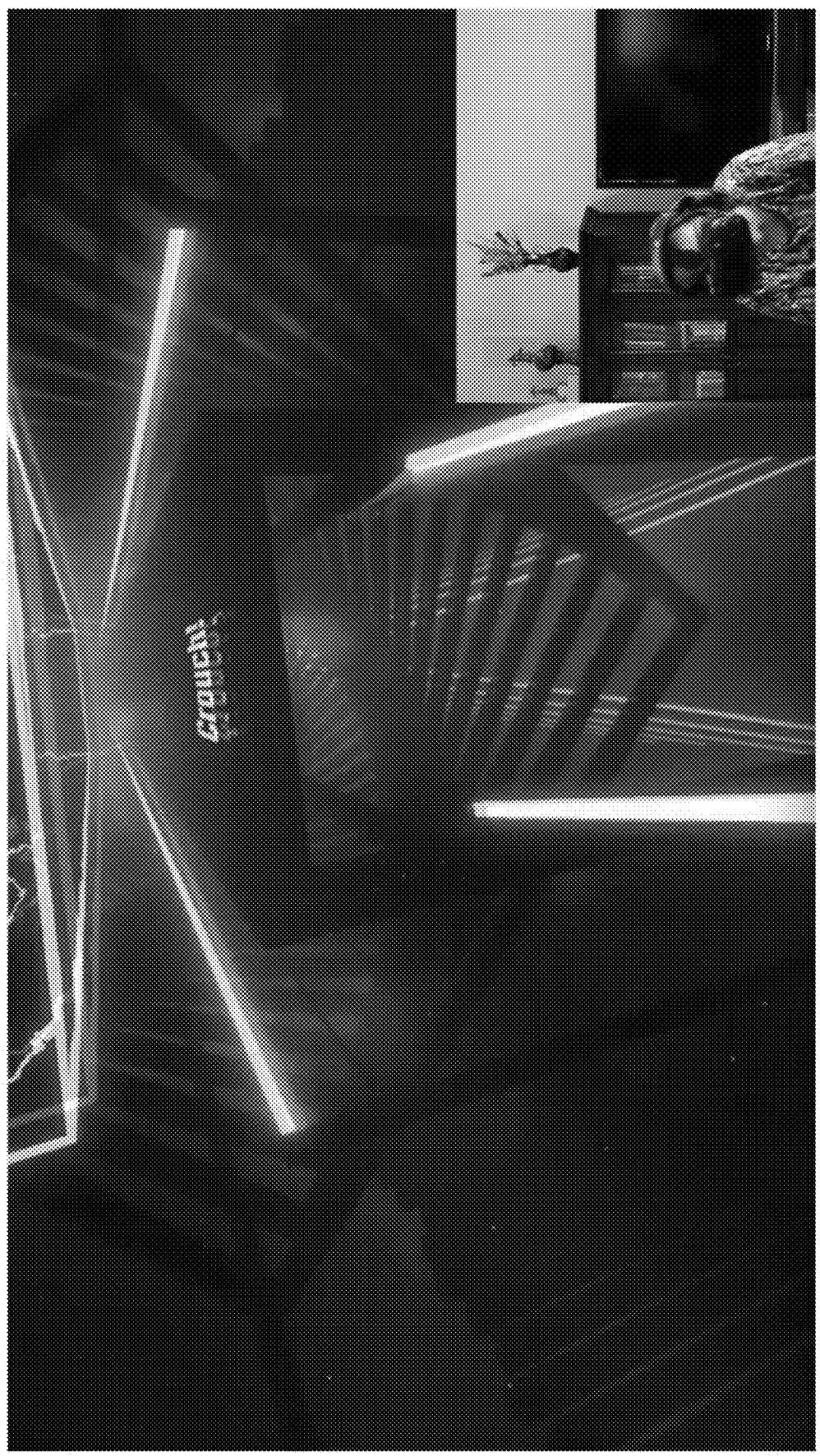
FIG. 12B is a screenshot of a GUI with instructions to the player, consistent with various embodiments.

FIG. 12B is a screenshot of a GUI with instructions to the player, consistent with various embodiments. In FIG. 12B, the GUI indicates to the player that some of the digital objects presented in the 3D virtual space are to be avoided by ducking or crouching.

Figure 13:
FIG. 13 is a screenshot of a GUI with instructions to the player, consistent with various embodiments.

FIG. 13 is a screenshot of a GUI with instructions to the player, consistent with various embodiments. In FIG. 13, the GUI indicates to the player that the player can gain points by cutting the correct digital objects and in the correct manner.

Figure 14:
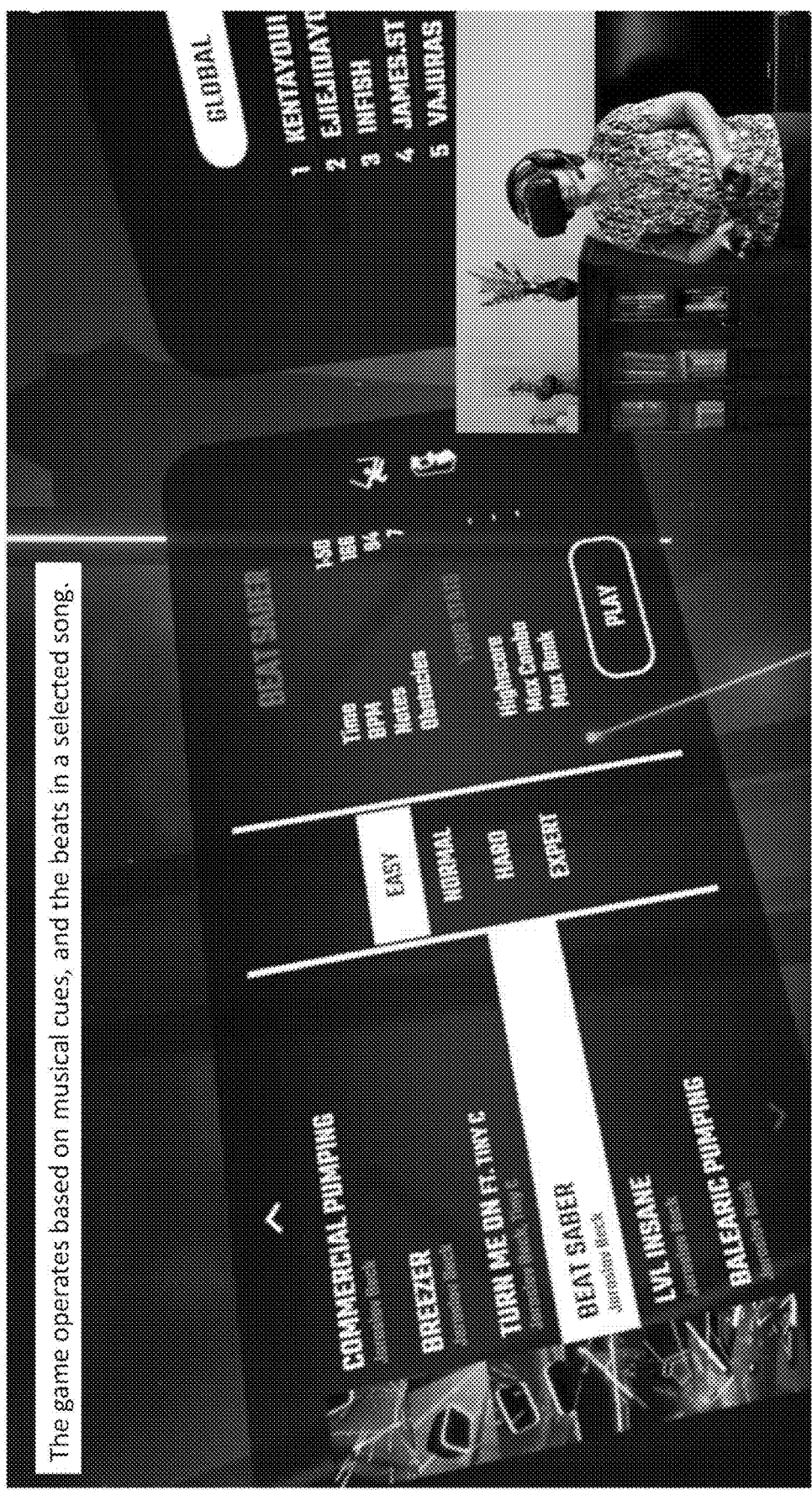
FIG. 14 is a screenshot of a GUI in which the player can select various options, consistent with various embodiments.

FIG. 14 is a screenshot of a GUI in which the player can select various options, consistent with various embodiments. In FIG. 14, the GUI presents the player with various songs to select from and a difficulty level of the game. Note that the digital objects are presented in the 3D virtual space based on the beats in the music.

Figure 15:
FIG. 15 is a screenshot of a GUI showing multiple digital objects approaching the player in the 3D virtual space, consistent with various embodiments.

FIG. 15 is a screenshot of a GUI showing multiple digital objects approaching the player in the 3D virtual space, consistent with various embodiments.

Figure 16:
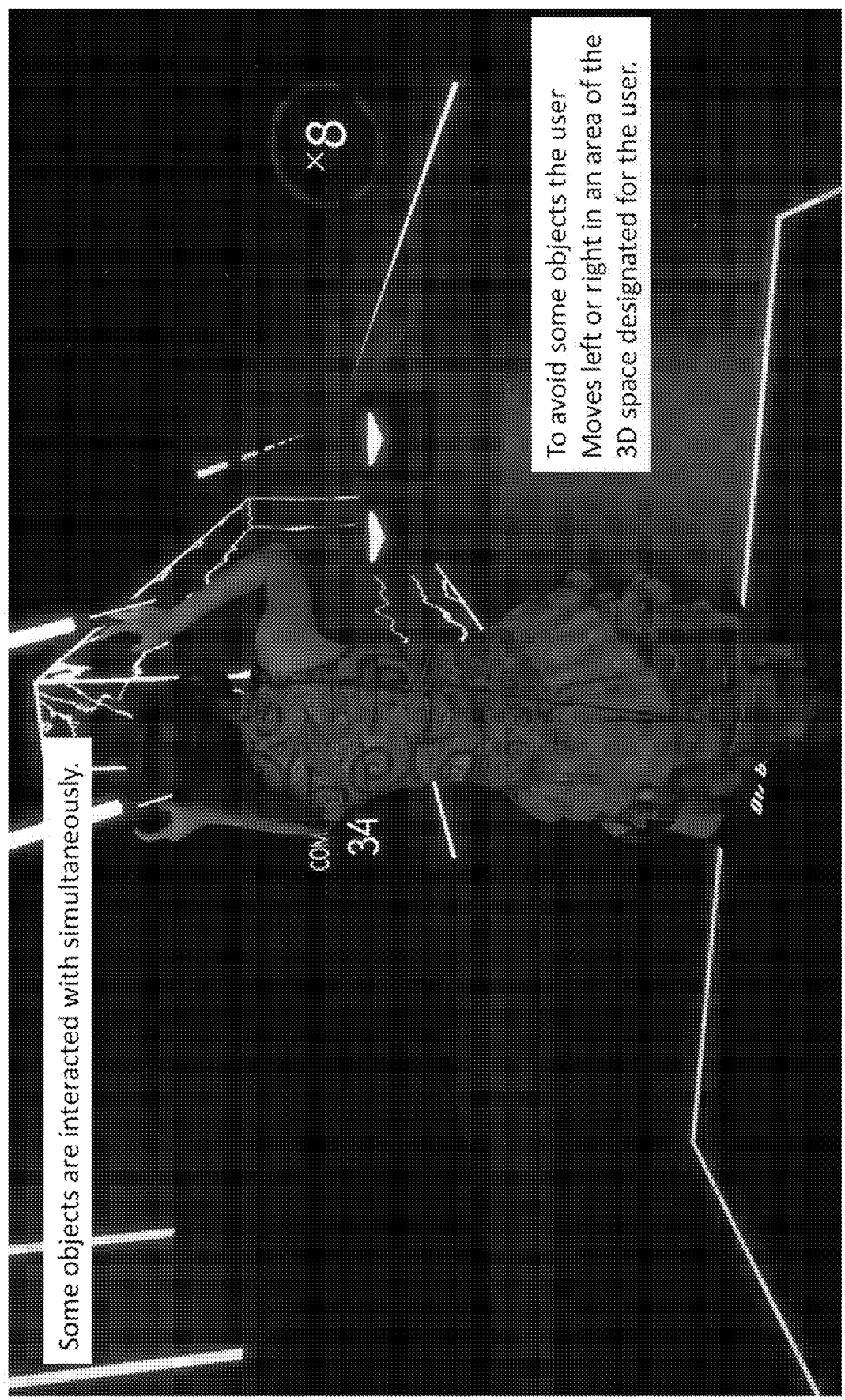
FIG. 16 is a screenshot of a GUI showing multiple digital objects approaching the player in the 3D virtual space, consistent with various embodiments.

FIG. 16 is a screenshot of a GUI showing multiple digital objects approaching the player in the 3D virtual space, consistent with various embodiments. In FIG. 16, the game presents digital blocks and digital obstacles simultaneously. The player has to slash the digital blocks but avoid the digital obstacles.

Figure 17:
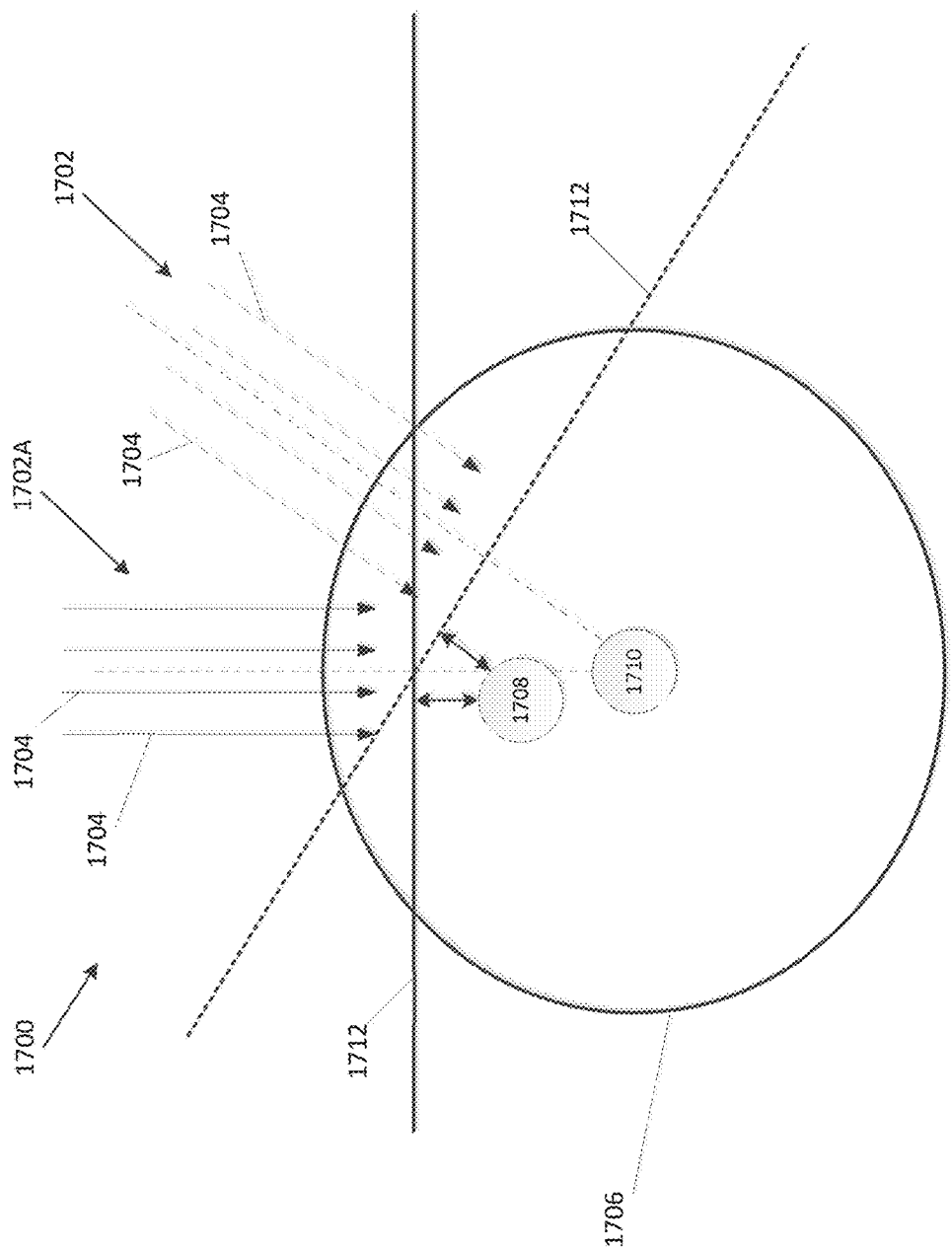
FIG. 17 is a diagram of a multi-lane game environment.

FIG. 17 is a diagram of a multi-lane game environment 1700. In some embodiments, multiple corridors or lanes 1702 exist around the player existing at angular positions around a circle or sphere. The multi-lane environment 1700 may be implemented in virtual or augmented reality and make use of an apparatus that tracks angular motion of the player's head (e.g., roll, pitch, and yaw), such as a head mounted display or external monitoring system. Each lane 1702 includes multiple vectors or traversal paths 1704 that digital objects are spawned and programed to progress along toward a player space 1706. The game enables the player 1708 to translate position (e.g., motion in the X, Y, or Z axes) within the player space 1706 (e.g., so as to dodge incoming obstacles). In some embodiments, the player space 1706 is centered around a static anchor point 1710 from which each lane 1702 radiates out from.

While the player 1708 may translate through the player space 1706, digital objects continue to approach, or traverse the player space 1706 relative to, the static anchor point 1710. A positive game action occurs when the player 1708 is able to cause a collision at a particular collision distance 1712 between certain digital objects and their respective, player-controlled digital element. The positioning of the collision distance 1712 where the player initiates collisions with the digital objects is measured as a distance from the player's position 1708. In some embodiments, the collision distance 1712 from the player is a function of the digital elements wielded by the player. Where the digital elements are swords, the length of the collision distance 1712 may be a function of the length of the sword.

As the player 1708 turns their head (e.g., through roll, pitch, and/or yaw movement) a current or active lane 1702A of objects is engaged. In some embodiments, the digital elements collide only with digital objects generated in the active lane 1702A. In other embodiments, collisions may occur across any of the lanes. Different game actions may result (e.g., differing quantities of points awarded) for collisions occurring in non-active lanes as opposed to the active lane 1702A.

In some embodiments, the lanes 1702 exist at all times within the game environment whether or not the lanes 1702 are presently being displayed. For example, the virtual environment may include the lanes 1702 as data constructs while they remain dormant (e.g., do not have active digital objects) and activate display of the lanes 1702 when a digital object is generated to progress down a traversal path 1704 of the lane 1702. Alternatively, the lanes 1702 may be generated in response to a call to generate a digital object that would necessarily require a traversal path 1704 of a lane 1702 in order to progress toward the relevant end point.

In some embodiments, digital objects approach, or traverse relative to, the position of the player 1708. Because the player is enabled to translate through the player space 1706, traversal of the digital objects may appear to take non-linear or arcing paths that "fall into" the player's position 1708 as if trapped by a virtual gravity well or magnetic field.

Lanes 1702 for digital objects may exist 360 degrees about the anchor point 1710, or player position 1708, and 360 degrees from a virtual horizon. In some embodiments, lanes 1702 intersect the player space 1706 (e.g., do not pass directly through the player position or the anchor point).

Figure 18:
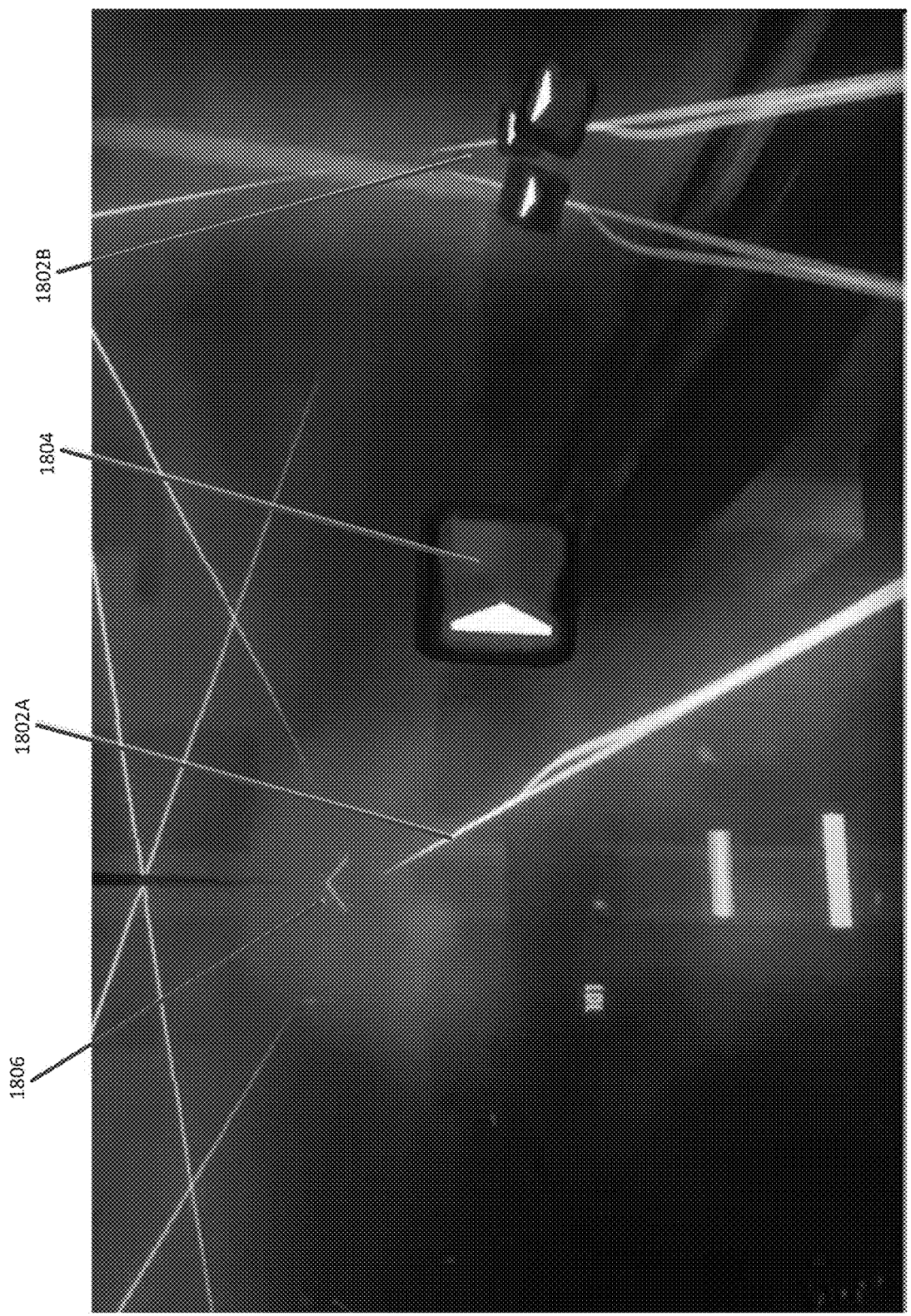
FIG. 18 is a screenshot of a GUI showing two lanes at different angles about the player, each lane including digital objects approaching the player in the 3D virtual space, consistent with various embodiments.

FIG. 18 is a screenshot of a GUI showing two lanes 1802 at different angles about the player, each lane including digital objects 1804 approaching the player in the 3D virtual space, consistent with various embodiments. The active lane 1802A is pictured on the left and is indicated by a lane guide 1806. In the screenshot, the player is preparing to switch active lanes by turning their head (yaw) to the non-active lane 1802B to the right. In some embodiments, the non-active lane(s) 1802B is indicated to the player through their peripheral vision in the display of the virtual player space (e.g., through direct display). Optionally, additional visual guides displayed at the edges of the player's vision indicating that the player should either turn their head or prepare to turn their head.

As the player's head turns and centers vision on a lane, the active lane changes (and the lane guide 1806 shifts to the new active lane). In some embodiments, the distance the player must turn their head in order to trigger a change in the active lane 1802A is based on the degrees from the active lane. For example, if the next lane from the active lane is forty-five degrees to the right, the amount the player must turn their head is a function of forty-five degrees (e.g., various embodiments require a 20%, 50%, 51%, 60%, 75%, 90%, 100%, etc. degrees of turning of the total to trigger the shift in lane).

Figure 19:
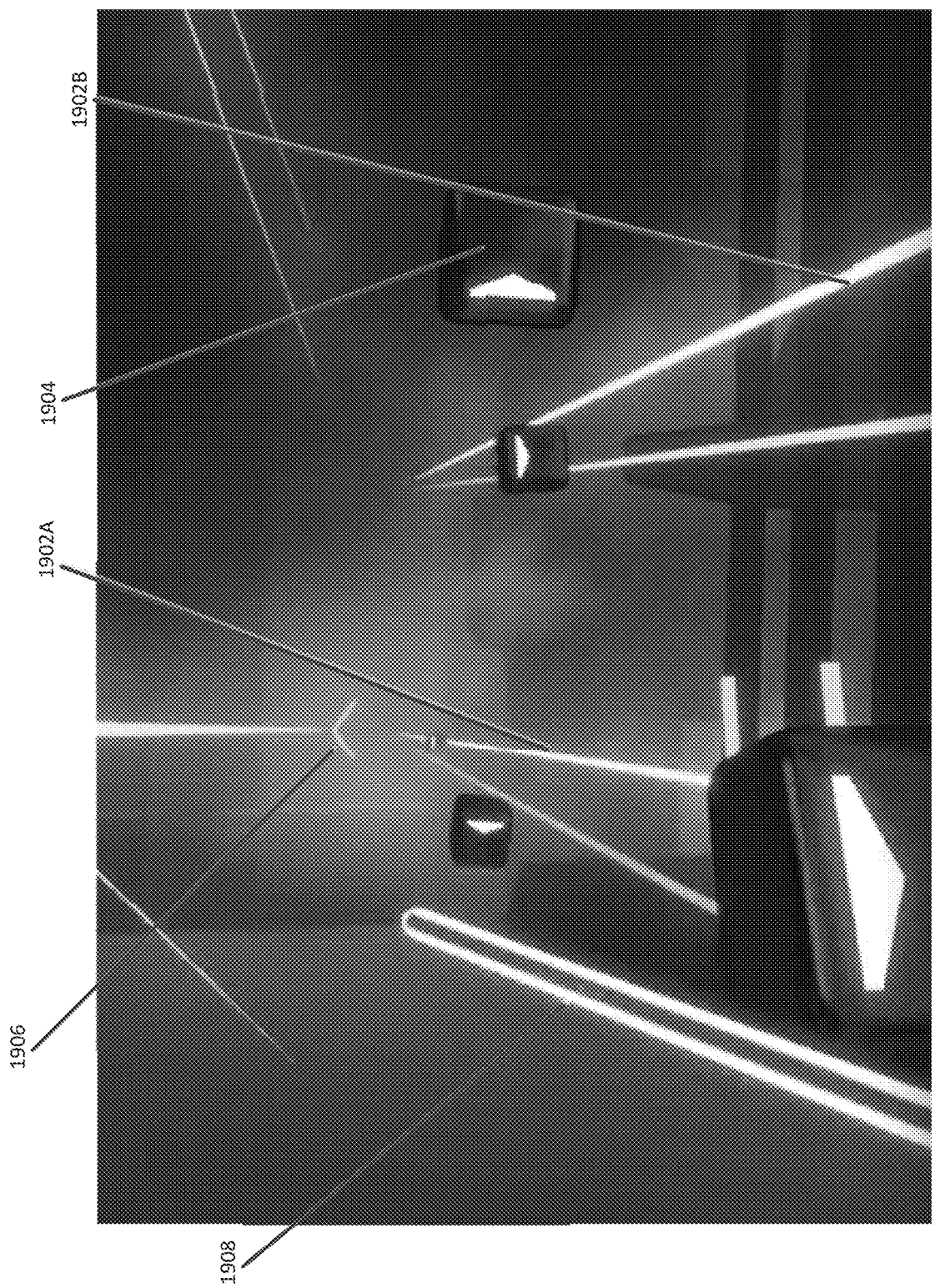
FIG. 19 is a screenshot of a GUI showing two parallel lanes of digital objects approaching the player in the 3D virtual space, consistent with various embodiments.

FIG. 19 is a screenshot of a GUI showing two parallel lanes 1902A, B of digital objects 1904 approaching the player in the 3D virtual space, consistent with various embodiments. Lanes 1902 may intersect the player space without intersecting with either the player's position or an anchor point. For example, two parallel lanes 1902A, B may straddle the anchor point (not pictured).

In some embodiments, where there are two parallel lanes 1902A, B, there still exists an active lane 1902A and a non-active lane 1902B. The active lane 1902A is denoted by the lane guide 1906. The player position (not shown) may be implied from the screenshot by the positioning of the digital element 1908.

Figure 20:
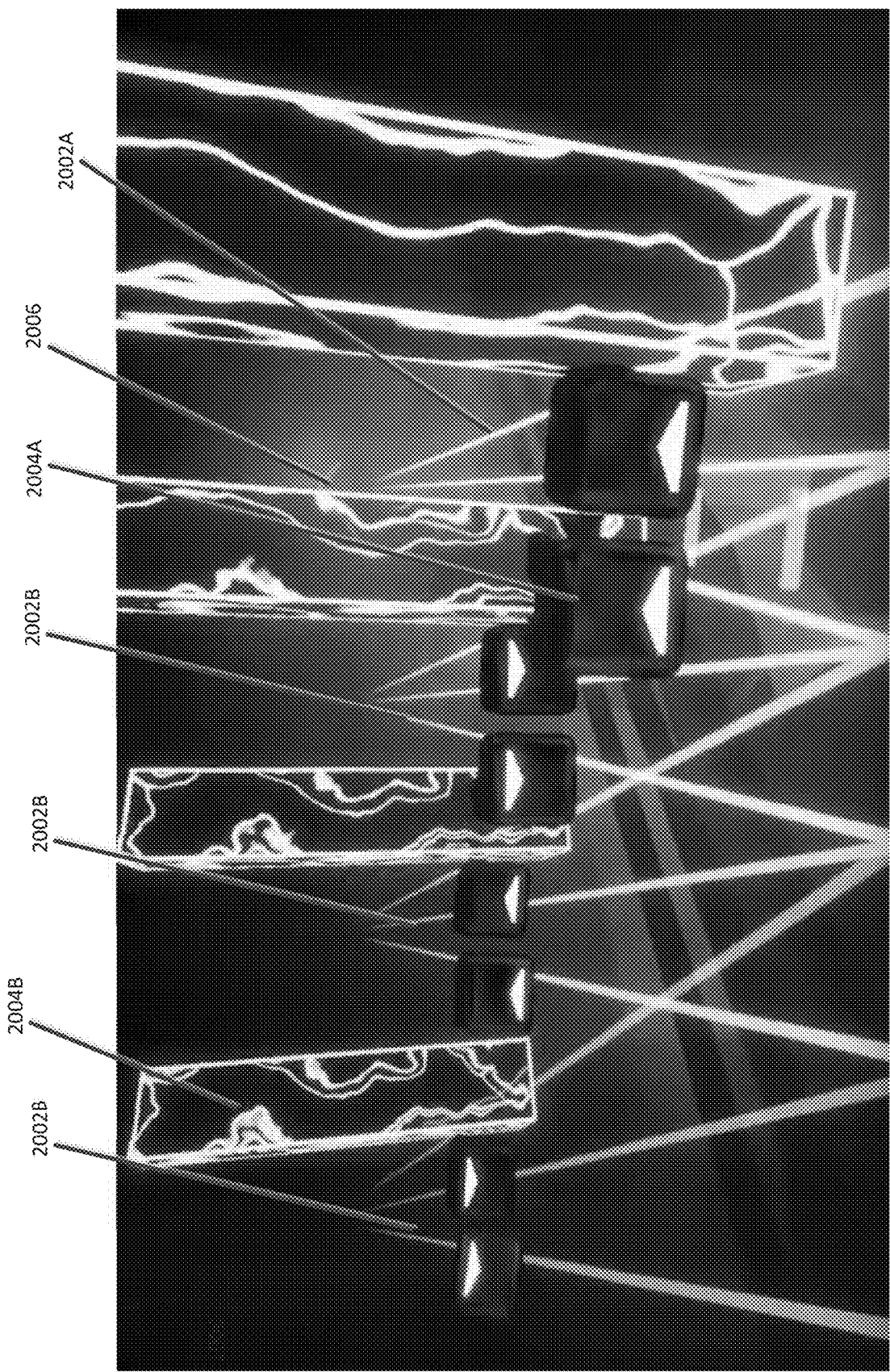
FIG. 20 is a screenshot of a GUI showing multiple lanes at different angles of digital objects approaching the player in the 3D virtual space using a static world center, consistent with various embodiments.

FIG. 20 is a screenshot of a GUI showing multiple lanes 2002 at different angles of digital objects 2004A, B approaching the player in the 3D virtual space using a static world center (not pictured), consistent with various embodiments. Pictured here, a large number of lanes 2002 are present in close proximity requiring the player to act quickly in each lane 2002 with both translational movement to the left, and element-object collisions (occurring in opposite directions in each lane). The player attempts to cause collisions with the digital cubes 2004A, while physically dodging the digital obstructions 2004B (by remaining on the left side of each lane/radius to the static anchor point/world center). The active lane 2002A is pictured to the right side and indicated by the lane guide 2006. The non-active lanes 2002B are to the left of the active lane 2002A.

Because the lanes 2002 are in close proximity, the range of head rotation required to trigger a shift in the active lane 2002A is lower than was pictured in FIG. 18.

Figure 21:
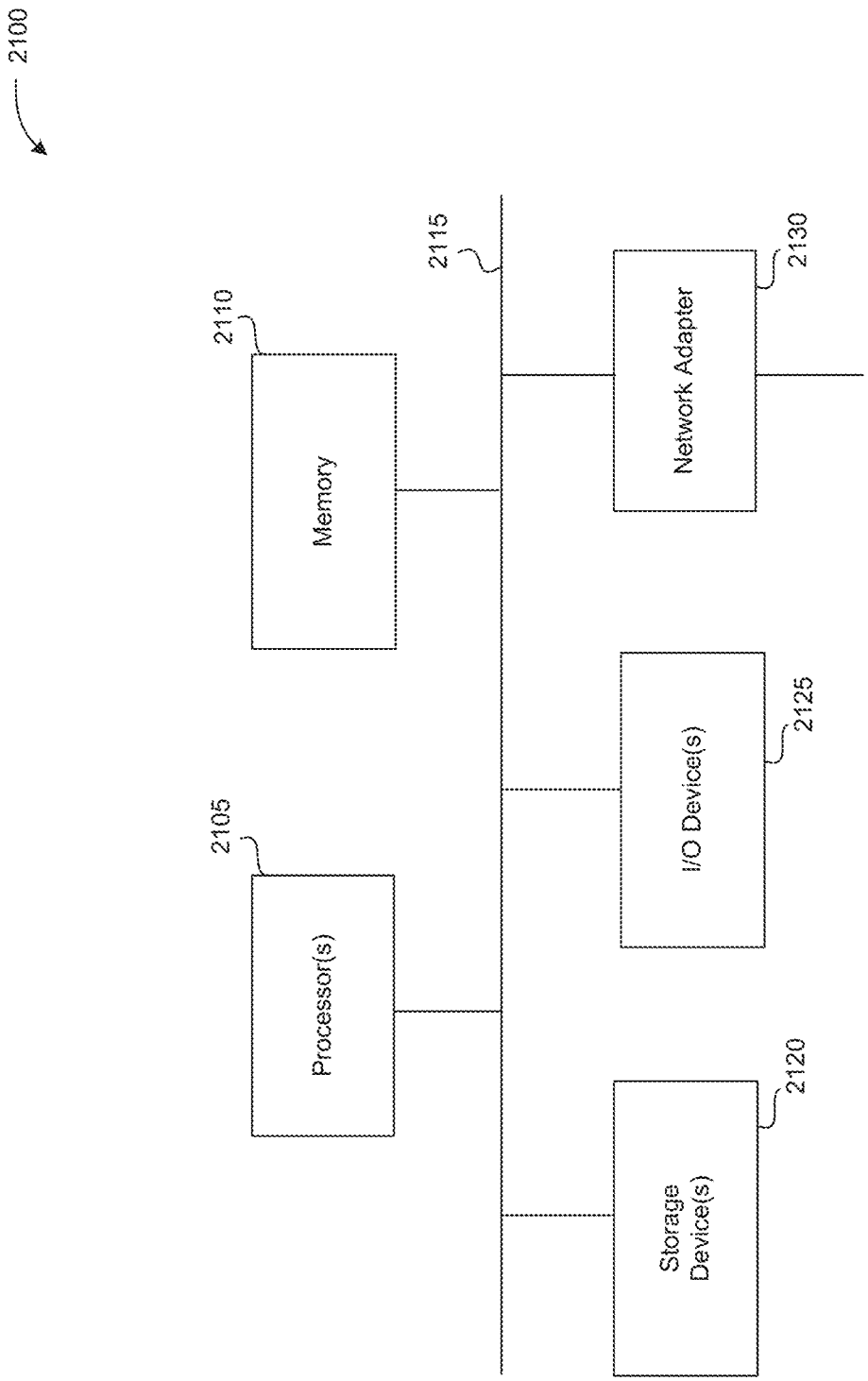
FIG. 21 is a block diagram of a computer system as may be used to implement features of some embodiments of the disclosed technology.

FIG. 21 is a block diagram of a computer system as may be used to implement features of some embodiments of the disclosed technology. The computing system 2100 may be used to implement any of the entities, components, modules, interfaces, or services depicted in the foregoing figures (and in this specification). The computing system 2100 may include one or more central processing units ("processors") 2105, memory 2110, input/output devices 2125 (e.g., keyboard and pointing devices, display devices), storage devices 2120 (e.g., disk drives), and network adapters 2130 (e.g., network interfaces) that are connected to an interconnect 2115. The interconnect 2115 is illustrated as an abstraction that represents any one or more separate physical buses, point to point connections, or both connected by appropriate bridges, adapters, or controllers. The interconnect 2115, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 2110 and storage devices 2120 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 2110 can be implemented as software and/or firmware to program the processor(s) 2105 to carry out actions described above. In some embodiments, such software or firmware may be initially provided to the processing system 2100 by downloading it from a remote system through the computing system 2100 (e.g., via network adapter 2130).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method comprising:
   rendering a 3D virtual space that includes a digital position of a user and multiple object traversal paths;
   defining a center position of the 3D virtual space, wherein the multiple object traversal paths are at different angles relative of the center position and each object traversal path intersects the center position, and the digital position of the user is associated with the center position;
   instantiating, in the 3D virtual space, a first digital element, wherein a set of coordinates and orientation of the first digital element correspond to an orientation and position of a first real hand of the user;
   graphically representing a plurality of digital objects in the 3D virtual space that each approach the center position from a distance along one of the multiple object traversal paths; and
   causing a game action to occur in response to a digital collision in the 3D virtual space between a first digital object of the plurality of digital objects and the first digital element.

2. The method of claim 1, wherein a pace of the approach of the digital objects to the digital position of the user corresponds with musical notes.

3. The method of claim 1, further comprising:
causing a second game action to occur in response to a second digital object, of the plurality of digital objects, passing by a collision region without digitally colliding with the first digital element, wherein the collision region is positioned as a function of the digital position of the user.

4. The method of claim 1, wherein the first digital object includes a directional guide component indicating a direction of user interaction with the first digital object.

5. The method of claim 1, wherein the game action is any of:
increasing a game score;
decreasing the game score;
effecting a pace of the approach of the digital objects;
effecting a creation of the digital objects; or
effecting a rate of change in the game score.

6. The method of claim 1, further comprising:
engaging an active path, of the multiple object traversal paths, based on a position of the user's head,
wherein the active path is located centrally in a line of sight of the user's head, and
wherein the first digital element, as controlled by the user, is enabled to only collide with digital objects present on the active path.

7. The method of claim 1, wherein each of the plurality of digital objects is associated with one or more of the multiple object traversal paths, and a first traversal path, that the first digital object is associated with, is dispositive of a manner in which the first digital object progresses toward the center position.

8. The method of claim 1, further comprising:
instantiating, in the 3D virtual space, a second digital element, wherein a second set of coordinates and orientation of the second digital element, relative to the digital position of the user, corresponds to an orientation and position of a second real hand of the user; and
causing an additional game action to occur in response to a digital collision in the 3D virtual space between a second digital object of the plurality of digital objects and the second digital element.

9. The method of claim 1, further comprising:
instantiating, in the 3D virtual space, a second digital element, wherein a second set of coordinates and orientation of the second digital element, relative to the digital position of the user, corresponds to an orientation and position of a second real hand of the user, and wherein a first subset of the plurality of digital objects correspond to the first digital element and a second subset of the plurality of digital objects correspond to the second digital element; and
causing an additional game action to occur, in response to a digital collision in the 3D virtual space between a second digital object, of the plurality of digital objects, and the second digital element.

10. The method of claim 1, further comprising:
displaying, to the user, a graphic guide indicating that digital objects are progressing toward the center position on a first path, of the multiple object traversal paths, that is outside the user's current field of view.

11. A system comprising:
one or more processors; and
one or more memories storing instructions that, when executed by the one or more processors, cause the computing system to perform a process comprising:
rendering a 3D virtual space that includes a digital position of a user and multiple object traversal paths;
defining a center position of the 3D virtual space, wherein the multiple object traversal paths are at different angles relative of the center position and each object traversal path intersects the center position, and the digital position of the user is associated with the center position;
instantiating, in the 3D virtual space, a first digital element, wherein a set of coordinates and orientation of the first digital element correspond to a tracked orientation and position of a first real hand of the user;
graphically representing a plurality of digital objects in the 3D virtual space that each approach the center position from a distance along one of the multiple object traversal paths; and
causing a game action to occur in response to a digital collision in the 3D virtual space between a first digital object of the plurality of digital objects and the first digital element.

12. The system of claim 11, wherein the orientation and position of the first real hand of the user are tracked by a hand tracking apparatus that includes one or more of:
hand-held peripherals that wirelessly transmit the orientation and position to a communication apparatus communicatively coupled with the one or more processors;
hand-held peripherals including magnetic position sensors that sense a position of the hand-held peripherals in relation to a non-hand-held peripheral;
a depth sensing camera positioned toward at least the first hand of the user; or
a combination thereof.

13. The system of claim 11, wherein the 3D virtual space is any of:
an immersive virtual reality environment wherein the 3D space surrounds the user;
a digital space overlaid on a real space via augmented reality wherein the 3D space surrounds the user; or
a digital space wherein a user perspective is positioned external to a fourth wall.

14. The system of claim 11, further comprising:
a body or head tracking apparatus that tracks body or head position and orientation, wherein a detected change in body or head position and orientation cause the one or more processors to effect a corresponding change in a position and orientation of the digital position of the user in the 3D virtual space.

15. The system of claim 11, further comprising:
a body or head tracking apparatus that tracks body or head position and orientation,
wherein a detected change in body or head position and orientation cause the one or more processors to effect a corresponding change in a position and orientation of the digital position of the user in the 3D virtual space; and
wherein the process further comprises engaging an active path, of multiple traversal paths, based on a position of a user's head as detected by the head tracking apparatus, wherein the active path is located centrally in a line of sight of the user's head, and wherein the first digital element, as controlled by the user, is enabled to only collide with digital objects present on the active path.

16. A computer-readable storage medium storing instructions that, when executed by a computing system, cause the computing system to perform a process comprising:

instantiating a 3D game space that includes a plurality of 3D lanes, the 3D game space having a virtual volume and a defined center position, wherein the defined center position is associated with a player location, wherein each 3D lane intersects the defined center position, and wherein multiple digital objects each progress toward the defined center position along one of the plurality of 3D lanes;

tracking a player hand location based on a real-world position of a user's hand in six degrees of freedom, wherein a digital element corresponds to the player hand location;

engaging an active lane of the plurality of 3D lanes based on a field of view of the player location, the active lane located centrally in a line of sight of the user's head, wherein the digital element as controlled by the user only interacts with digital objects, of the multiple digital objects, that are associated with the active lane; and detecting a collision between a first digital object associated with the active lane and the digital element controlled by the user, wherein the collision causes a game action.

17. The computer-readable storage medium of claim 16, wherein the process further comprises:

playing a musical score including musical notes, wherein a pace of movement of the multiple of digital objects, along the corresponding 3D lanes, is based on a tempo of the musical notes.

18. The computer-readable storage medium of claim 16, wherein the process further comprises:

displaying only a subset of the plurality of 3D lanes, wherein the subset includes those 3D lanes that include an active digital object.

19. The computer-readable storage medium of claim 16, wherein each digital object, of the multiple digital objects, is associated with one or more of the plurality of 3D lanes, and wherein a first 3D lane, with which the first digital object is associated, is dispositive of a manner in which the first digital object progresses toward the defined center position.

20. The computer-readable storage medium of claim 16, wherein at least a first subset, of the multiple digital objects, includes a directional guide component indicating a direction of user interaction with the first digital object, and wherein a detected collision, between the first subset of digital objects and the digital element, that occurs consistently with the directional guide component effect a first game action and detected collisions, between the first subset of digital objects and the digital elements, that occur inconsistently with the directional component effect a second game action.

\* \* \* \* \*